(12) United States Patent
Bone et al.

(10) Patent No.: US 10,025,062 B2
(45) Date of Patent: Jul. 17, 2018

(54) OPTICAL IMAGING LENS

(71) Applicant: Genius Electronic Optical Co., Ltd., Taichung (TW)

(72) Inventors: Matthew Bone, Taichung (TW); Shan Huang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 15/212,289

(22) Filed: Jul. 18, 2016

(65) Prior Publication Data

US 2018/0011289 A1    Jan. 11, 2018

(30) Foreign Application Priority Data

Jul. 5, 2016 (CN) .......................... 2016 1 0522854

(51) Int. Cl.
| | | |
|---|---|---|
| *G02B 9/34* | (2006.01) | |
| *G02B 13/00* | (2006.01) | |
| *G02B 9/58* | (2006.01) | |
| *G02B 27/00* | (2006.01) | |

(52) U.S. Cl.
CPC ............. *G02B 9/34* (2013.01); *G02B 9/58* (2013.01); *G02B 13/004* (2013.01); *G02B 27/0025* (2013.01)

(58) Field of Classification Search
CPC .................................... G02B 9/34; G02B 9/58
USPC ................................................. 359/781–783
See application file for complete search history.

(56) References Cited

U.S. PATENT DOCUMENTS

| | | | |
|---|---|---|---|
| 7,852,572 B2 | 12/2010 | Robinson | |
| 8,009,366 B2* | 8/2011 | Hirose | G02B 13/04 359/671 |
| 2008/0106809 A1* | 5/2008 | Hirano | G02B 9/58 359/784 |
| 2008/0316609 A1 | 12/2008 | Robinson | |
| 2008/0316618 A1* | 12/2008 | Yamakawa | G02B 9/34 359/781 |
| 2011/0164328 A1* | 7/2011 | Yamakawa | G02B 13/004 359/715 |
| 2011/0242683 A1* | 10/2011 | Yamakawa | G02B 13/04 359/715 |
| 2012/0250165 A1* | 10/2012 | Do | G02B 13/005 359/715 |
| 2014/0226222 A1* | 8/2014 | Hsieh | G02B 9/34 359/781 |

(Continued)

FOREIGN PATENT DOCUMENTS

| | | |
|---|---|---|
| TW | 201326886 | 7/2013 |
| TW | I474039 | 2/2015 |

(Continued)

*Primary Examiner* — Darryl J Collins
(74) *Attorney, Agent, or Firm* — JCIPRNET

(57) ABSTRACT

An optical imaging lens includes a first lens element, a second lens element, an aperture stop, a third lens element, and a fourth lens elements arranged in sequence from an object side to an image side along an optical axis, and each lens element has an object-side surface and an image-side surface. The first lens element has negative refracting power. The object-side surface of the second lens element has a concave portion in a vicinity of the optical axis. The image-side surface of the fourth lens element has a convex portion in a vicinity of a periphery of the fourth lens element.

14 Claims, 37 Drawing Sheets

(56) References Cited

U.S. PATENT DOCUMENTS

2015/0227021 A1* 8/2015 Huang ................ G02B 13/004
                                                      348/360
2017/0017061 A1* 1/2017 Liu ..................... G02B 13/004

FOREIGN PATENT DOCUMENTS

TW        201523015        6/2015
TW          I521233        2/2016

* cited by examiner

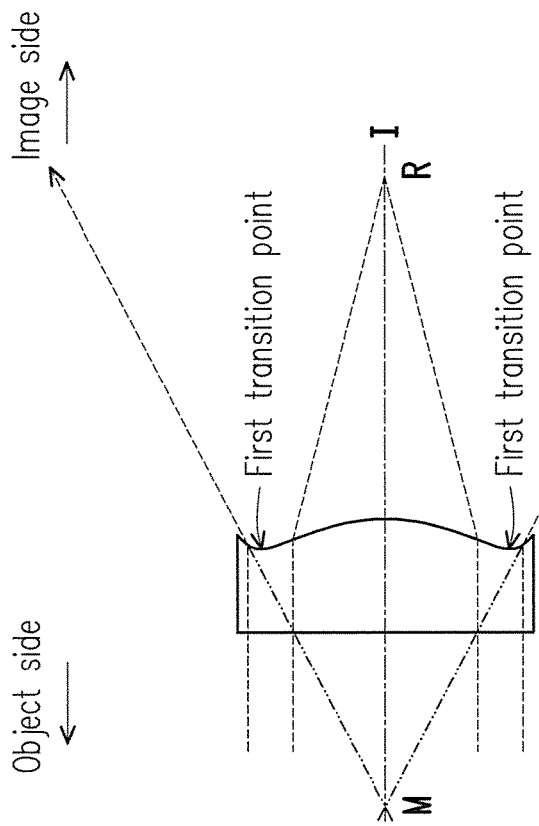
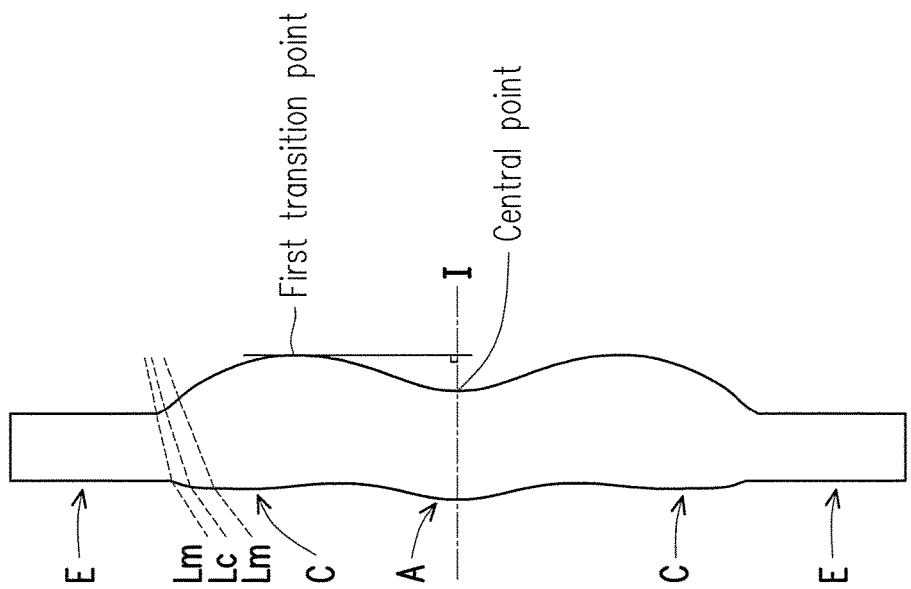
FIG. 1
FIG. 2

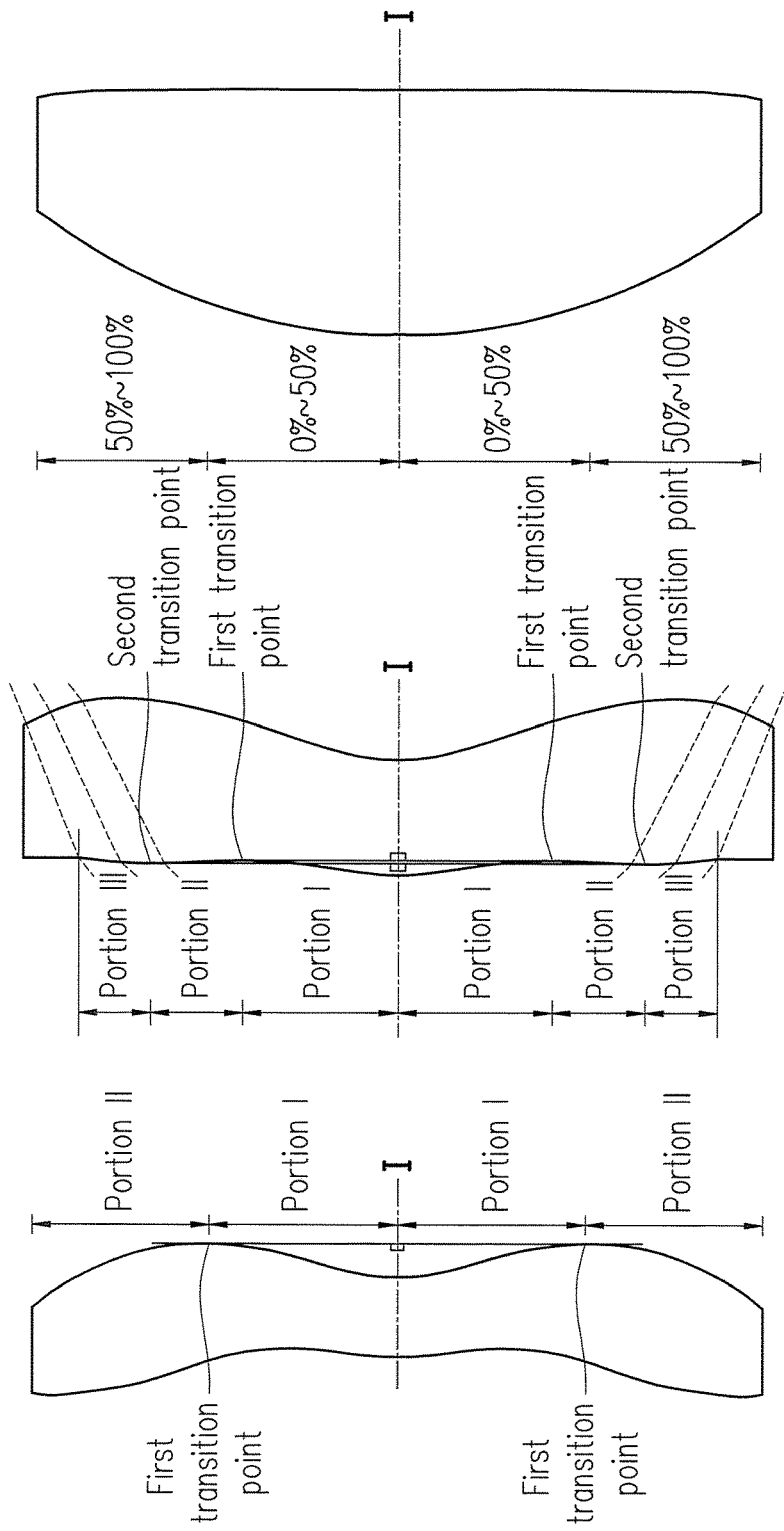

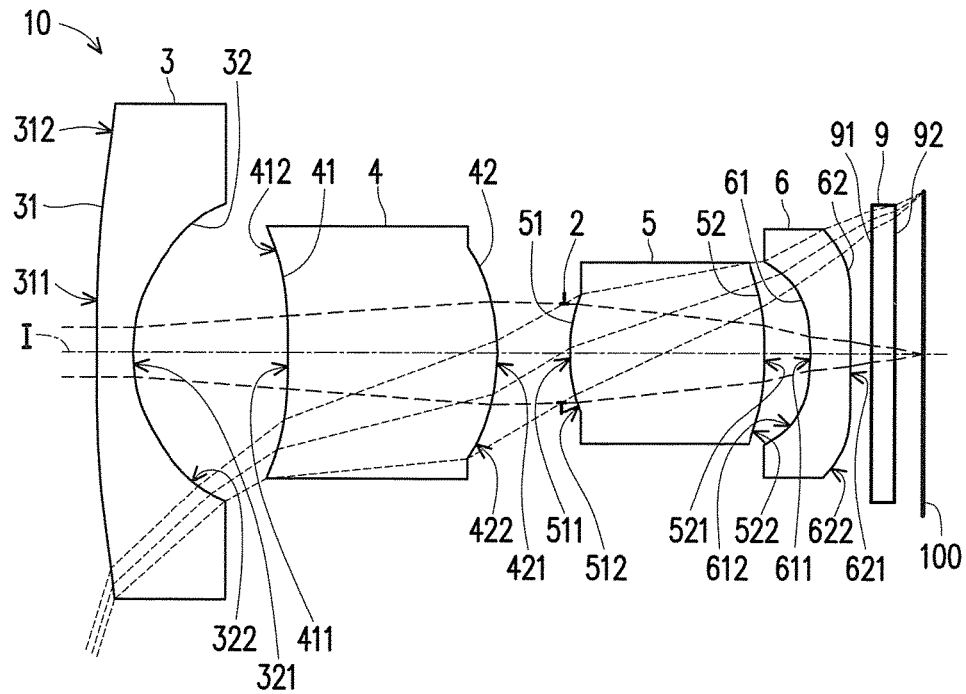
FIG. 6
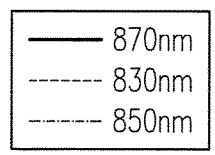
— 870nm
----- 830nm
-·-·- 850nm
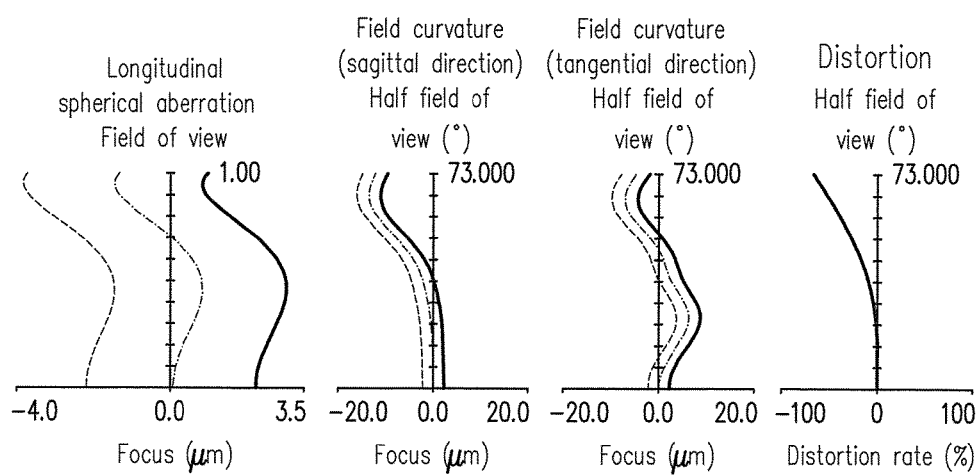
FIG. 7A  FIG. 7B  FIG. 7C  FIG. 7D

| First embodiment ||||||
|---|---|---|---|---|---|
| Effective focal length=1.861 mm , Half field of view (HFOV)=73.000°, Fno=2.80, System length=10.817 mm ||||||
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 30.537 | 0.475 | 1.544 | 55.959 | -4.270 |
| | Image-side surface 32 | 2.127 | 2.025 | | | |
| Second lens element 4 | Object-side surface 41 | -8.897 | 2.734 | 1.544 | 55.959 | 5.884 |
| | Image-side surface 42 | -2.588 | 0.866 | | | |
| Aperture stop 2 | | Infinity | 0.098 | | | |
| Third lens element 5 | Object-side surface 51 | 2.338 | 2.550 | 1.517 | 64.198 | 3.143 |
| | Image-side surface 52 | -3.218 | 0.588 | | | |
| Fourth lens element 6 | Object-side surface 61 | -4.143 | 0.514 | 1.661 | 20.401 | -3.562 |
| | Image-side surface 62 | 5.326 | 0.298 | | | |
| Cover glass 9 | Object-side surface 91 | Infinity | 0.300 | 1.517 | 64.167 | |
| | Image-side surface 92 | Infinity | 0.370 | | | |
| | Image plane 100 | Infinity | | | | |

FIG. 8

| Sur-face | K | $a_4$ | $a_6$ | $a_8$ | $a_{10}$ |
|---|---|---|---|---|---|
| 31 | 0.000000E+00 | 1.682596E-03 | -6.521400E-05 | -3.280000E-06 | 0.000000E+00 |
| 32 | 0.000000E+00 | -7.732135E-03 | 3.488710E-04 | -5.245200E-05 | 0.000000E+00 |
| 41 | 0.000000E+00 | -2.081671E-02 | 2.310466E-03 | -3.784070E-03 | 0.000000E+00 |
| 42 | 0.000000E+00 | 8.778860E-03 | 5.327040E-04 | -5.365780E-04 | 1.525570E-04 |
| 51 | 0.000000E+00 | 7.533633E-03 | 2.738845E-03 | -4.488644E-03 | 0.000000E+00 |
| 52 | 0.000000E+00 | -2.730250E-04 | 6.447245E-03 | -1.765381E-03 | 0.000000E+00 |
| 61 | 0.000000E+00 | -2.043230E-01 | 1.615418E-02 | -9.846771E-03 | 0.000000E+00 |
| 62 | 0.000000E+00 | -1.216563E-01 | 2.283328E-02 | -5.509548E-03 | 6.758390E-04 |

FIG. 9

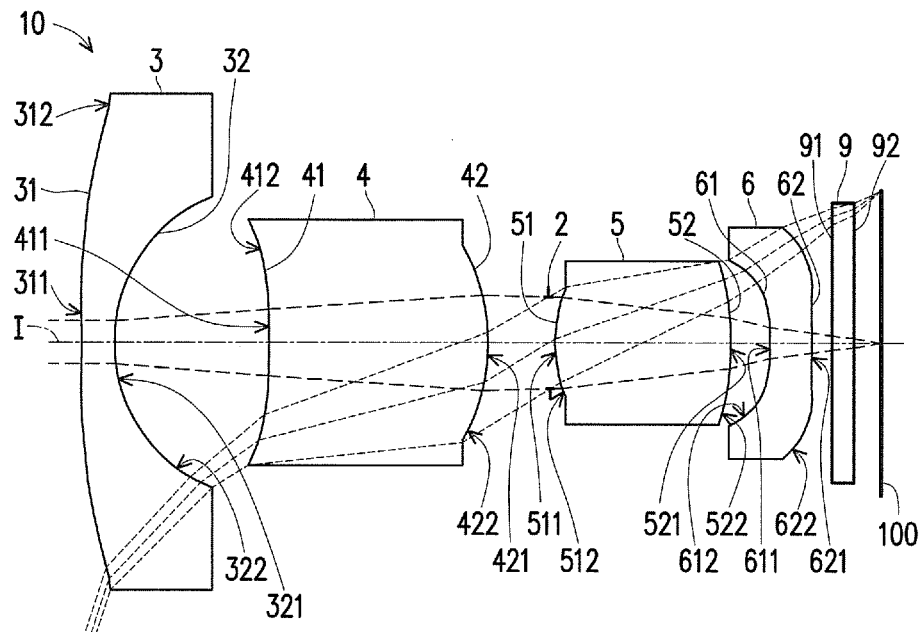
FIG. 10
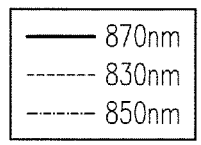
— 870nm
---- 830nm
----- 850nm
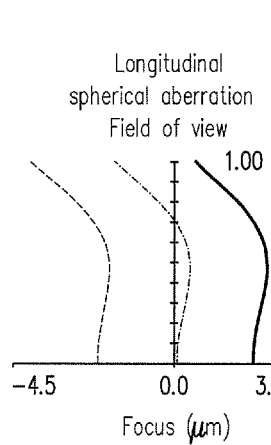
Longitudinal
spherical aberration
Field of view
FIG. 11A
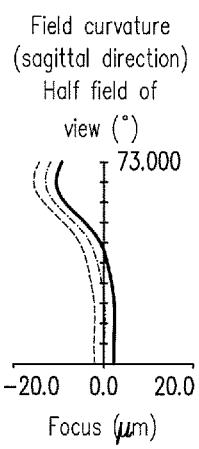
Field curvature
(sagittal direction)
Half field of
view (°)
FIG. 11B
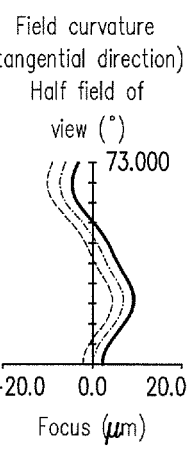
Field curvature
(tangential direction)
Half field of
view (°)
FIG. 11C
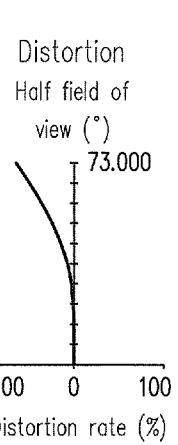
Distortion
Half field of
view (°)
FIG. 11D

| Second embodiment | | | | | | |
|---|---|---|---|---|---|---|
| Effective focal length=1.803 mm , Half field of view (HFOV)=73.000°, Fno=2.80, System length=11.073 mm | | | | | | |
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 27.099 | 0.469 | 1.544 | 55.959 | -4.343 |
| | Image-side surface 32 | 2.140 | 2.148 | | | |
| Second lens element 4 | Object-side surface 41 | -9.943 | 3.011 | 1.544 | 55.959 | 5.828 |
| | Image-side surface 42 | -2.639 | 0.845 | | | |
| Aperture stop 2 | | Infinity | 0.098 | | | |
| Third lens element 5 | Object-side surface 51 | 2.241 | 2.430 | 1.517 | 64.198 | 3.213 |
| | Image-side surface 52 | -3.859 | 0.548 | | | |
| Fourth lens element 6 | Object-side surface 61 | -4.185 | 0.560 | 1.661 | 20.401 | -3.747 |
| | Image-side surface 62 | 5.925 | 0.293 | | | |
| Cover glass 9 | Object-side surface 91 | Infinity | 0.300 | 1.517 | 64.167 | |
| | Image-side surface 92 | Infinity | 0.370 | | | |
| | Image plane 100 | Infinity | | | | |

FIG. 12

| Surface | K | $a_4$ | $a_6$ | $a_8$ | $a_{10}$ |
|---|---|---|---|---|---|
| 31 | 0.000000E+00 | 3.325106E-03 | -1.372070E-04 | -1.954000E-06 | 0.000000E+00 |
| 32 | 0.000000E+00 | -5.534195E-03 | 1.675160E-04 | 3.770400E-05 | 0.000000E+00 |
| 41 | 0.000000E+00 | -1.980053E-02 | 2.377735E-03 | -3.520510E-04 | 0.000000E+00 |
| 42 | 0.000000E+00 | 1.086226E-02 | -2.896290E-04 | -3.213850E-04 | 1.229060E-04 |
| 51 | 0.000000E+00 | 1.102991E-02 | 2.496160E-04 | -1.836001E-03 | 0.000000E+00 |
| 52 | 0.000000E+00 | -6.544372E-03 | 6.735515E-03 | -2.892680E-04 | 0.000000E+00 |
| 61 | 0.000000E+00 | -2.067936E-01 | -4.665660E-04 | -9.835926E-03 | 0.000000E+00 |
| 62 | 0.000000E+00 | -1.151121E-01 | 1.864793E-02 | -5.891415E-03 | 8.949710E-04 |

FIG. 13

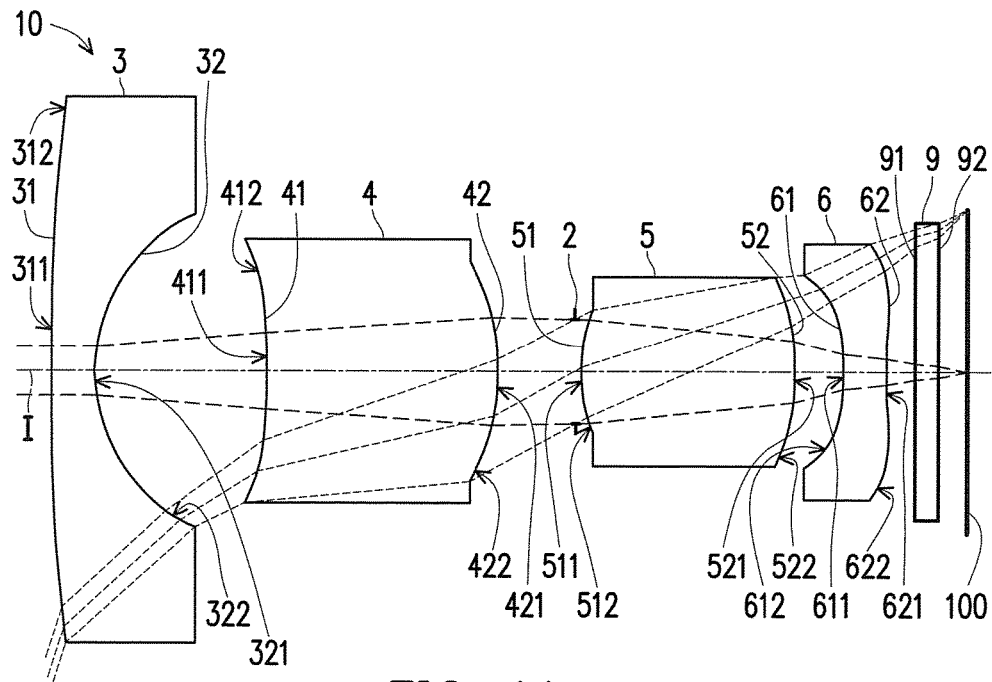
FIG. 14
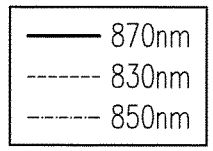
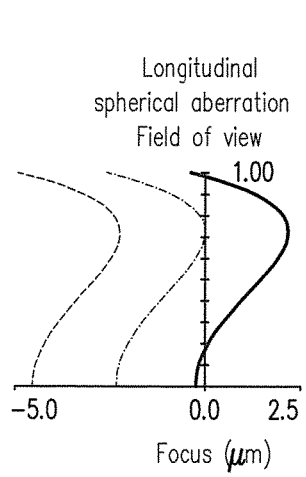
Longitudinal
spherical aberration
Field of view
FIG. 15A
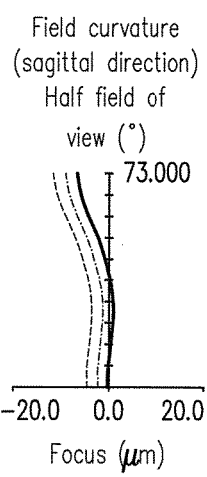
Field curvature
(sagittal direction)
Half field of
view (°)
FIG. 15B
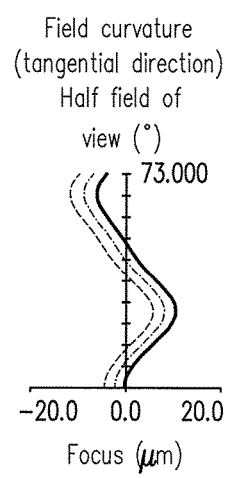
Field curvature
(tangential direction)
Half field of
view (°)
FIG. 15C
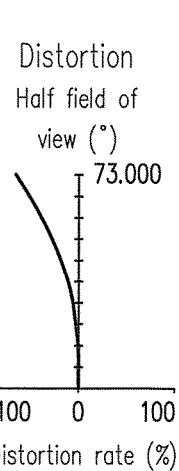
Distortion
Half field of
view (°)
FIG. 15D

| Third embodiment | | | | | | |
|---|---|---|---|---|---|---|
| Effective focal length=1.698 mm , Half field of view (HFOV)=73.000°, Fno=2.80, System length=10.895 mm | | | | | | |
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 53.542 | 0.522 | 1.544 | 55.959 | -3.880 |
| | Image-side surface 32 | 2.004 | 2.043 | | | |
| Second lens element 4 | Object-side surface 41 | -8.487 | 2.740 | 1.544 | 55.959 | 6.100 |
| | Image-side surface 42 | -2.636 | 0.904 | | | |
| Aperture stop 2 | | Infinity | 0.097 | | | |
| Third lens element 5 | Object-side surface 51 | 2.272 | 2.529 | 1.517 | 64.198 | 3.003 |
| | Image-side surface 52 | -2.930 | 0.581 | | | |
| Fourth lens element 6 | Object-side surface 61 | -5.034 | 0.508 | 1.661 | 20.401 | -3.694 |
| | Image-side surface 62 | 4.644 | 0.301 | | | |
| Cover glass 9 | Object-side surface 91 | Infinity | 0.300 | 1.517 | 64.167 | |
| | Image-side surface 92 | Infinity | 0.370 | | | |
| | Image plane 100 | Infinity | | | | |

FIG. 16

| Surface | K | $a_4$ | $a_6$ | $a_8$ | $a_{10}$ |
|---|---|---|---|---|---|
| 31 | 0.000000E+00 | 1.258629E-03 | -3.963900E-05 | -1.590000E-06 | 0.000000E+00 |
| 32 | 0.000000E+00 | -7.384923E-03 | 1.752210E-04 | -8.166900E-05 | 0.000000E+00 |
| 41 | 0.000000E+00 | -2.018906E-02 | 2.002390E-03 | -5.870270E-04 | 0.000000E+00 |
| 42 | 0.000000E+00 | 4.348739E-03 | 8.190040E-04 | -3.843040E-04 | 8.552700E-05 |
| 61 | 0.000000E+00 | -1.925321E-01 | 1.810301E-02 | -9.569524E-03 | 0.000000E+00 |
| 62 | 0.000000E+00 | -1.213738E-01 | 2.532966E-02 | -5.225378E-03 | 4.952720E-04 |

FIG. 17

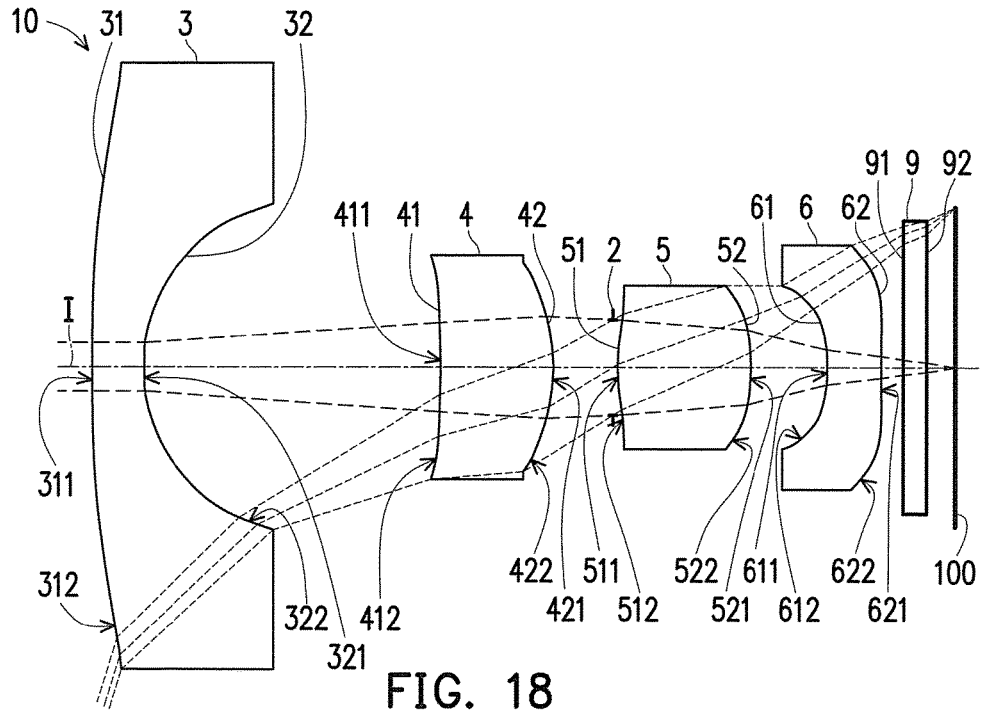
FIG. 18
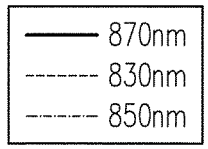
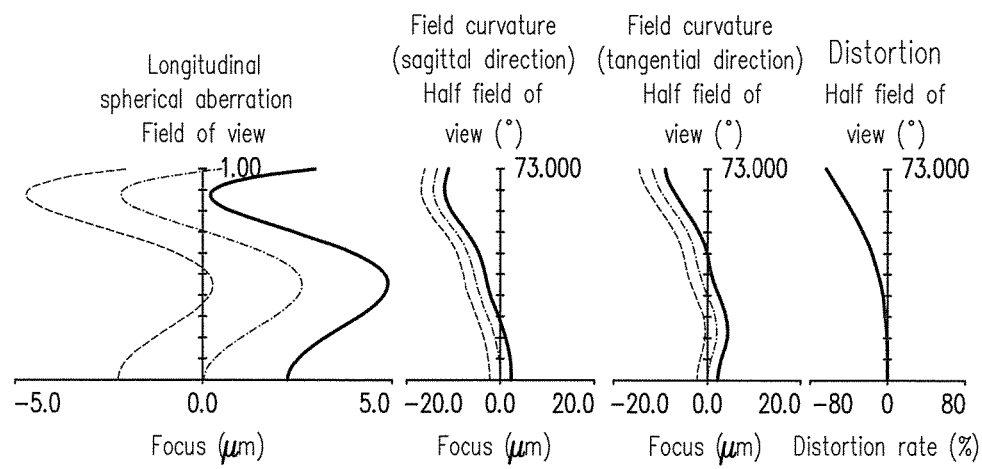
FIG. 19A  FIG. 19B  FIG. 19C  FIG. 19D

| Fourth embodiment | | | | | | |
|---|---|---|---|---|---|---|
| Effective focal length=1.827 mm , Half field of view (HFOV)=73.000°, Fno=2.80, System length=11.458 mm | | | | | | |
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 29.998 | 0.684 | 1.544 | 55.959 | -4.553 |
| | Image-side surface 32 | 2.249 | 3.938 | | | |
| Second lens element 4 | Object-side surface 41 | -31.705 | 1.504 | 1.544 | 55.959 | 5.376 |
| | Image-side surface 42 | -2.697 | 0.799 | | | |
| Aperture stop 2 | | Infinity | 0.076 | | | |
| Third lens element 5 | Object-side surface 51 | 3.934 | 1.759 | 1.517 | 64.198 | 3.279 |
| | Image-side surface 52 | -2.468 | 1.016 | | | |
| Fourth lens element 6 | Object-side surface 61 | -3.395 | 0.714 | 1.661 | 20.401 | -3.584 |
| | Image-side surface 62 | 7.677 | 0.299 | | | |
| Cover glass 9 | Object-side surface 91 | Infinity | 0.300 | 1.517 | 64.167 | |
| | Image-side surface 92 | Infinity | 0.371 | | | |
| | Image plane 100 | Infinity | | | | |

FIG. 20

| Sur-face | K | $a_4$ | $a_6$ | $a_8$ | $a_{10}$ |
|---|---|---|---|---|---|
| 31 | 0.000000E+00 | 1.906998E-03 | -1.129430E-04 | 1.389000E-06 | 0.000000E+00 |
| 32 | 0.000000E+00 | -3.139900E-04 | 1.360970E-04 | 4.444600E-05 | 0.000000E+00 |
| 41 | 0.000000E+00 | -1.513230E-02 | 1.571175E-03 | -7.066710E-04 | 0.000000E+00 |
| 42 | 0.000000E+00 | 6.274395E-03 | -1.907374E-03 | 9.864100E-05 | 4.234700E-05 |
| 51 | 0.000000E+00 | -1.501387E-02 | -5.852180E-04 | -2.332196E-02 | 0.000000E+00 |
| 52 | 0.000000E+00 | -4.283491E-02 | 3.894350E-03 | -8.565063E-03 | 0.000000E+00 |
| 61 | 0.000000E+00 | -2.059435E-01 | -1.267950E-02 | -1.594264E-02 | 0.000000E+00 |
| 62 | 0.000000E+00 | -1.023311E-01 | 1.320575E-02 | -2.301254E-03 | 2.406750E-04 |

FIG. 21

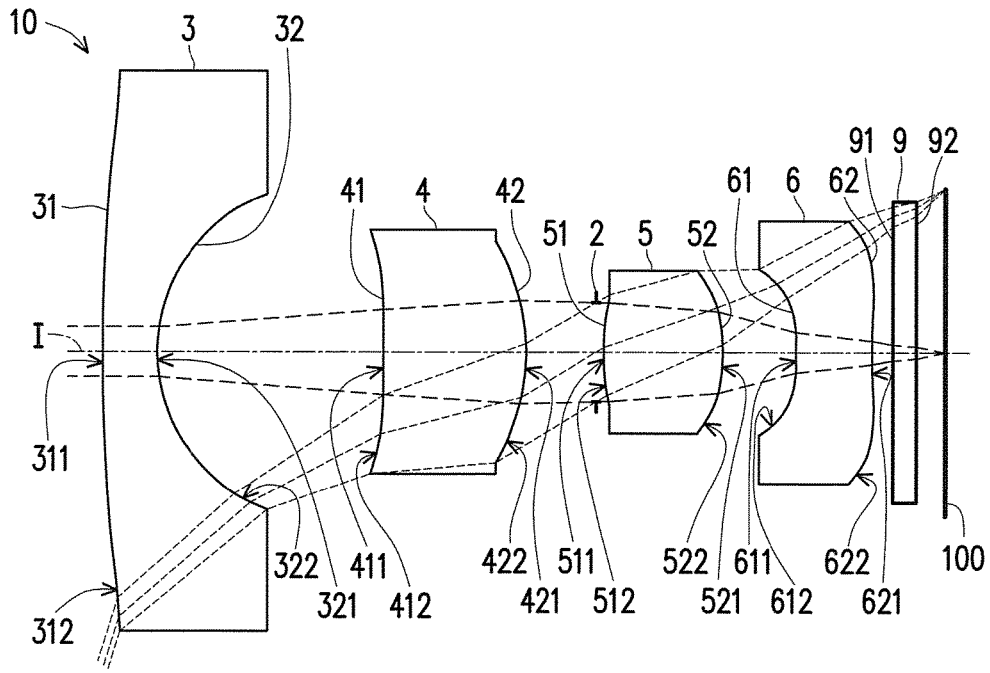
FIG. 22
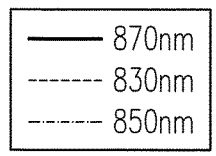
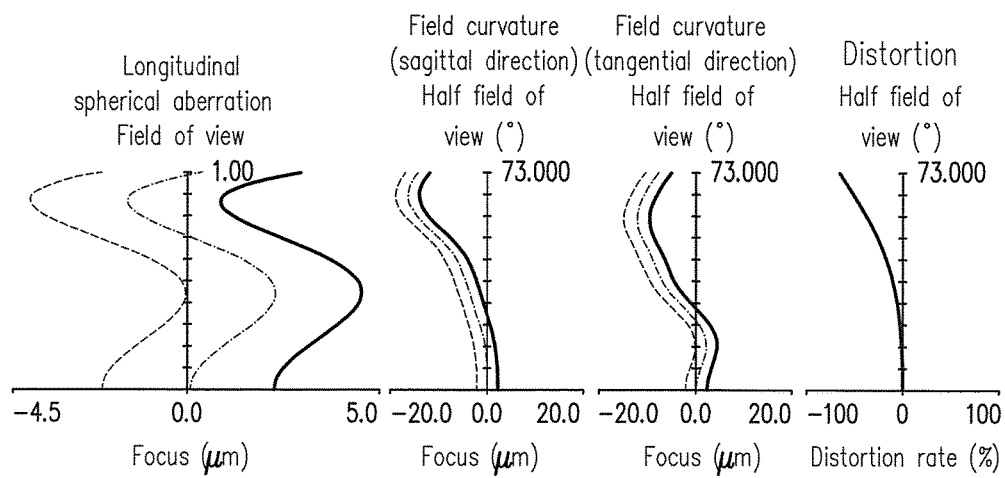
FIG. 23A  FIG. 23B  FIG. 23C  FIG. 23D

| Fifth embodiment | | | | | | |
|---|---|---|---|---|---|---|
| Effective focal length=1.843 mm, Half field of view (HFOV)=73.000°, Fno=2.80, System length=10.795 mm | | | | | | |
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 53.883 | 0.684 | 1.544 | 55.959 | -4.221 |
| | Image-side surface 32 | 2.165 | 2.910 | | | |
| Second lens element 4 | Object-side surface 41 | -15.071 | 1.810 | 1.544 | 55.959 | 5.916 |
| | Image-side surface 42 | -2.733 | 0.902 | | | |
| Aperture stop 2 | | Infinity | 0.096 | | | |
| Third lens element 5 | Object-side surface 51 | 3.151 | 1.506 | 1.517 | 64.198 | 2.936 |
| | Image-side surface 52 | -2.392 | 0.959 | | | |
| Fourth lens element 6 | Object-side surface 61 | -3.407 | 0.973 | 1.661 | 20.401 | -3.387 |
| | Image-side surface 62 | 6.567 | 0.267 | | | |
| Cover glass 9 | Object-side surface 91 | Infinity | 0.300 | 1.517 | 64.167 | |
| | Image-side surface 92 | Infinity | 0.388 | | | |
| | Image plane 100 | Infinity | | | | |

FIG. 24

| Surface | K | $a_4$ | $a_6$ | $a_8$ | $a_{10}$ |
|---|---|---|---|---|---|
| 31 | 0.000000E+00 | 1.913716E-03 | -1.093420E-04 | 6.800000E-08 | 0.000000E+00 |
| 32 | 0.000000E+00 | -1.526878E-03 | 1.980060E-04 | 5.106100E-05 | 0.000000E+00 |
| 41 | 0.000000E+00 | -1.617464E-02 | 1.732955E-03 | -6.128250E-04 | 0.000000E+00 |
| 42 | 0.000000E+00 | 4.816230E-03 | -1.515537E-03 | 3.720800E-05 | 6.514300E-05 |
| 51 | 0.000000E+00 | -2.605979E-02 | -6.330387E-03 | -2.983890E-02 | 0.000000E+00 |
| 52 | 0.000000E+00 | -5.446320E-02 | 3.241994E-03 | -1.371510E-02 | 0.000000E+00 |
| 61 | 0.000000E+00 | -1.969074E-01 | -9.094574E-03 | -3.039150E-02 | 0.000000E+00 |
| 62 | 0.000000E+00 | -8.749071E-02 | 1.481452E-02 | -2.972898E-03 | 2.241430E-04 |

FIG. 25

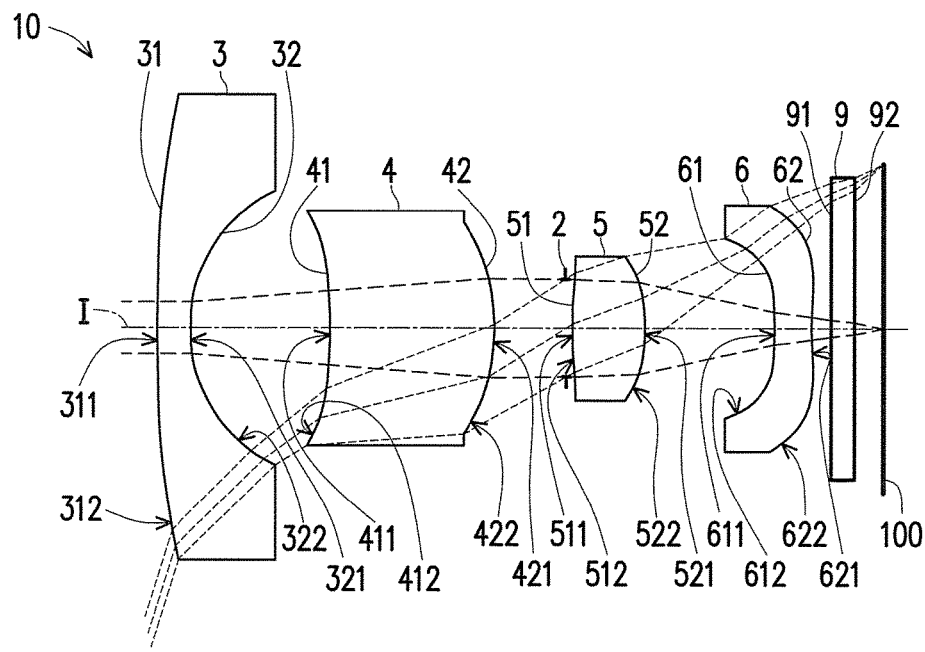
FIG. 26
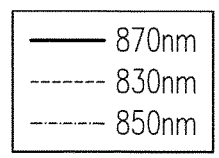
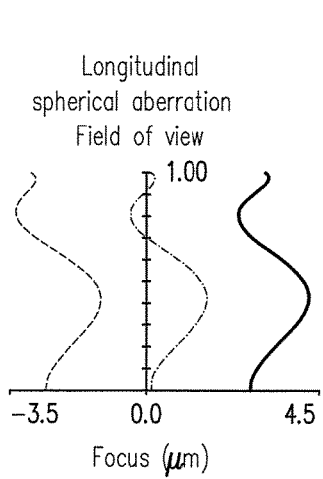
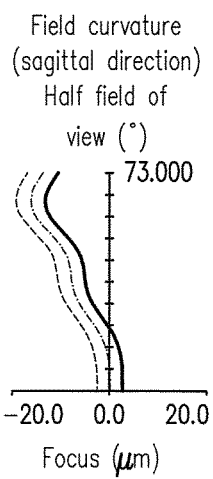
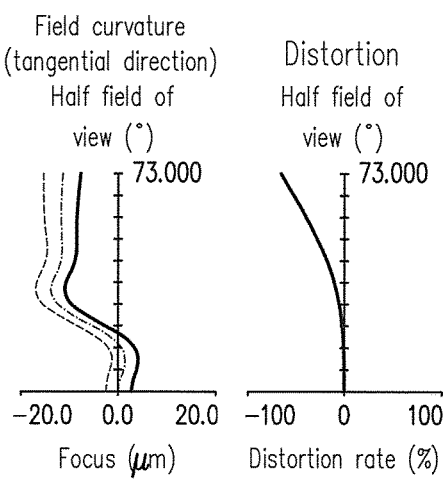
FIG. 27A  FIG. 27B  FIG. 27C  FIG. 27D

| Sixth embodiment ||||||
|---|---|---|---|---|---|
| Effective focal length=1.883 mm, Half field of view (HFOV)=73.000°, Fno=2.80, System length=9.371 mm ||||||
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 63.884 | 0.421 | 1.544 | 55.959 | -4.043 |
| | Image-side surface 32 | 2.094 | 1.808 | | | |
| Second lens element 4 | Object-side surface 41 | -7.820 | 2.106 | 1.544 | 55.959 | 6.081 |
| | Image-side surface 42 | -2.520 | 0.920 | | | |
| Aperture stop 2 | | Infinity | 0.091 | | | |
| Third lens element 5 | Object-side surface 51 | 4.440 | 0.926 | 1.517 | 64.198 | 3.159 |
| | Image-side surface 52 | -2.349 | 1.666 | | | |
| Fourth lens element 6 | Object-side surface 61 | -6.140 | 0.482 | 1.661 | 20.401 | -4.750 |
| | Image-side surface 62 | 6.168 | 0.262 | | | |
| Cover glass 9 | Object-side surface 91 | Infinity | 0.300 | 1.517 | 64.167 | |
| | Image-side surface 92 | Infinity | 0.389 | | | |
| | Image plane 100 | Infinity | | | | |

FIG. 28

| Sur-face | K | $a_4$ | $a_6$ | $a_8$ | $a_{10}$ |
|---|---|---|---|---|---|
| 31 | 0.000000E+00 | 6.800079E-03 | -6.704210E-04 | 1.930700E-05 | 0.000000E+00 |
| 32 | 0.000000E+00 | 4.798609E-03 | 5.954440E-04 | 5.058360E-04 | 0.000000E+00 |
| 41 | 0.000000E+00 | -2.568151E-02 | 3.800470E-04 | -7.783720E-04 | 0.000000E+00 |
| 42 | 0.000000E+00 | 7.436240E-03 | -2.582721E-03 | 9.814530E-04 | -1.310510E-04 |
| 51 | 0.000000E+00 | -4.519174E-02 | -1.159307E-02 | -4.531654E-02 | 0.000000E+00 |
| 52 | 0.000000E+00 | -4.439110E-02 | -1.015772E-03 | -2.976167E-02 | 0.000000E+00 |
| 61 | 0.000000E+00 | -2.003802E-01 | -4.165304E-03 | -3.484343E-02 | 0.000000E+00 |
| 62 | 0.000000E+00 | -1.229996E-01 | 1.008142E-02 | -4.936369E-03 | 6.986010E-04 |

FIG. 29

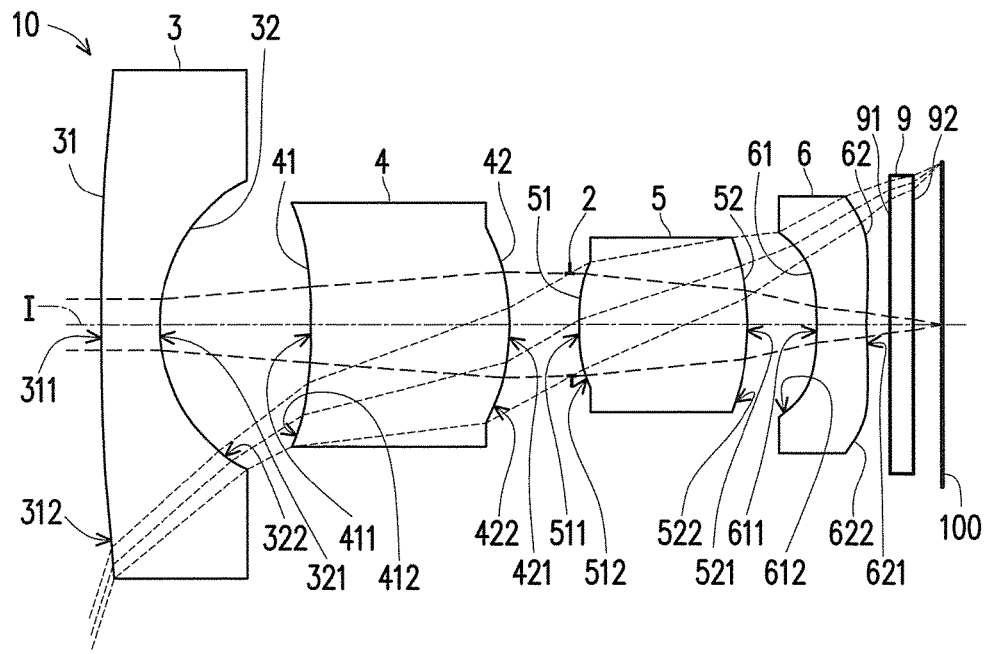
FIG. 30
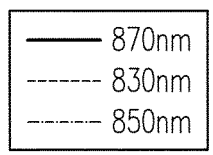
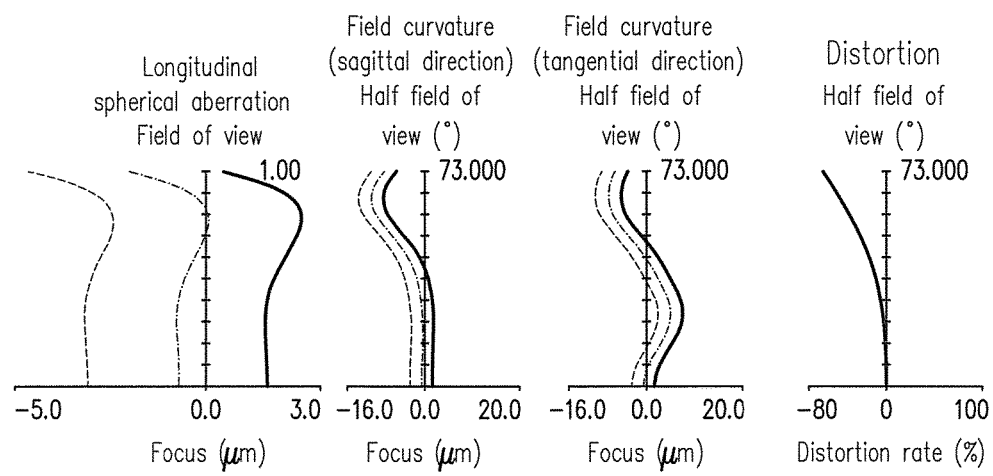
FIG. 31A  FIG. 31B  FIG. 31C  FIG. 31D

| Seventh embodiment | | | | | | |
|---|---|---|---|---|---|---|
| Effective focal length=1.845 mm , Half field of view (HFOV)=73.000°, Fno=2.80, System length=10.679 mm | | | | | | |
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 65.817 | 0.738 | 1.544 | 55.959 | -3.919 |
| | Image-side surface 32 | 2.037 | 1.912 | | | |
| Second lens element 4 | Object-side surface 41 | -9.259 | 2.526 | 1.544 | 55.959 | 6.313 |
| | Image-side surface 42 | -2.725 | 0.791 | | | |
| Aperture stop 2 | | Infinity | 0.098 | | | |
| Third lens element 5 | Object-side surface 51 | 2.404 | 2.126 | 1.517 | 64.198 | 3.105 |
| | Image-side surface 52 | -3.249 | 0.888 | | | |
| Fourth lens element 6 | Object-side surface 61 | -4.602 | 0.633 | 1.661 | 20.401 | -3.940 |
| | Image-side surface 62 | 5.891 | 0.296 | | | |
| Cover glass 9 | Object-side surface 91 | Infinity | 0.300 | 1.517 | 64.167 | |
| | Image-side surface 92 | Infinity | 0.370 | | | |
| | Image plane 100 | Infinity | | | | |

FIG. 32

| Surface | K | $a_4$ | $a_6$ | $a_8$ | $a_{10}$ |
|---|---|---|---|---|---|
| 31 | 0.000000E+00 | 1.732612E-03 | -7.434400E-05 | -2.775000E-06 | 0.000000E+00 |
| 32 | 0.000000E+00 | -5.095647E-03 | -7.607800E-05 | 2.664100E-05 | 0.000000E+00 |
| 41 | 0.000000E+00 | -2.174375E-02 | 1.908766E-03 | -1.772450E-04 | 0.000000E+00 |
| 42 | 0.000000E+00 | 3.354063E-03 | 3.260274E-03 | -1.993629E-03 | 4.804660E-04 |
| 61 | 0.000000E+00 | -1.538415E-01 | -5.234000E-05 | -6.396918E-03 | 0.000000E+00 |
| 62 | 0.000000E+00 | -9.539686E-02 | 1.625837E-02 | -3.349825E-03 | 2.830090E-04 |

FIG. 33

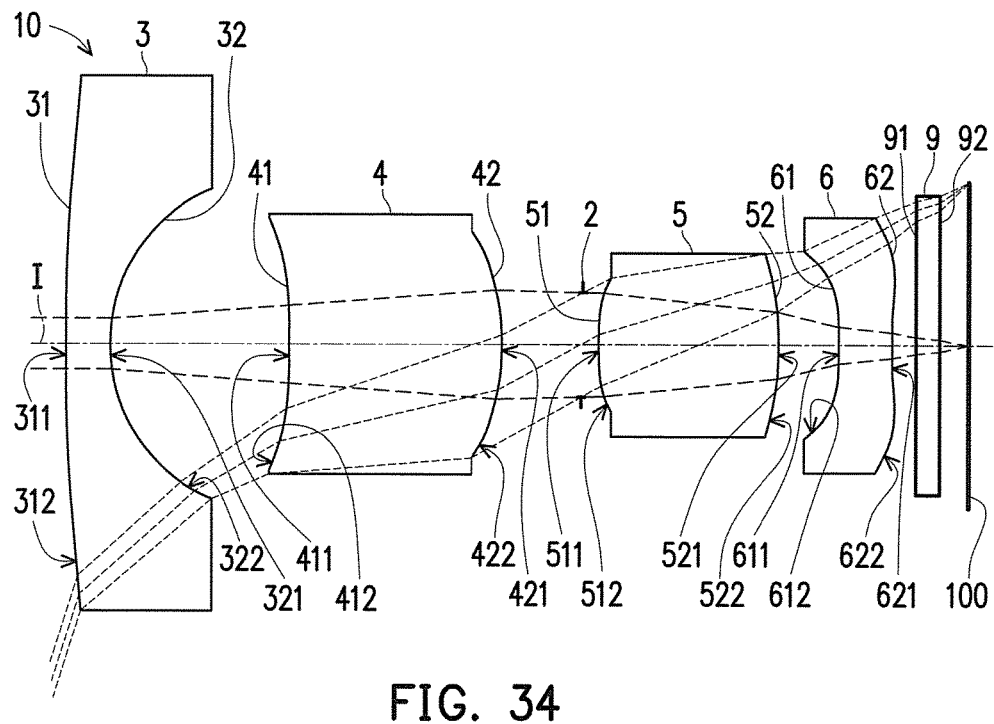
FIG. 34
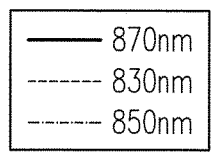
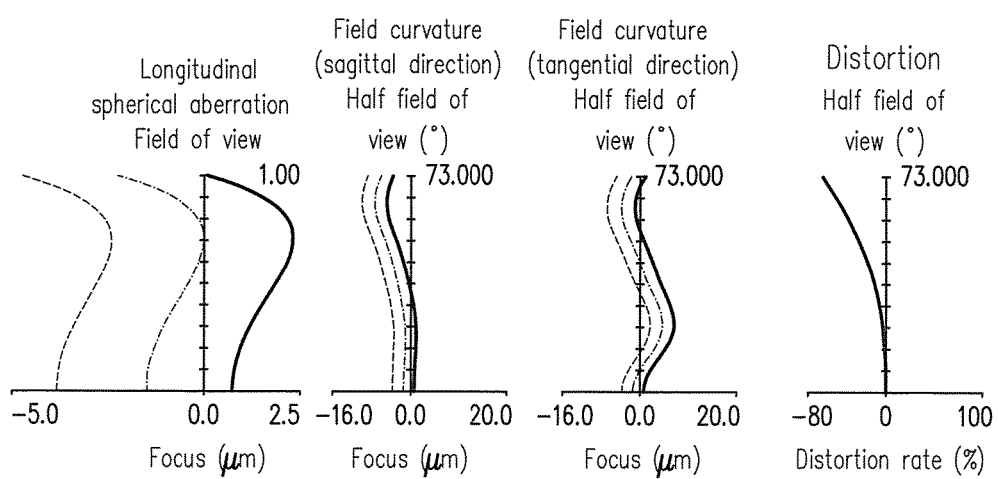
FIG. 35A  FIG. 35B  FIG. 35C  FIG. 35D

| Eighth embodiment ||||||
| --- | --- | --- | --- | --- | --- |
| Effective focal length=1.773 mm , Half field of view (HFOV)=73.000°, Fno=2.80, System length=11.048 mm ||||||
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 51.550 | 0.532 | 1.544 | 55.959 | -3.997 |
| | Image-side surface 32 | 2.059 | 2.187 | | | |
| Second lens element 4 | Object-side surface 41 | -8.512 | 2.604 | 1.544 | 55.959 | 6.331 |
| | Image-side surface 42 | -2.696 | 0.972 | | | |
| Aperture stop 2 | | Infinity | 0.197 | | | |
| Third lens element 5 | Object-side surface 51 | 2.245 | 2.215 | 1.517 | 64.198 | 3.145 |
| | Image-side surface 52 | -3.743 | 0.737 | | | |
| Fourth lens element 6 | Object-side surface 61 | -4.737 | 0.638 | 1.661 | 20.401 | -4.106 |
| | Image-side surface 62 | 6.228 | 0.295 | | | |
| Cover glass 9 | Object-side surface 91 | Infinity | 0.300 | 1.517 | 64.167 | |
| | Image-side surface 92 | Infinity | 0.370 | | | |
| | Image plane 100 | Infinity | | | | |

FIG. 36

| Sur-face | K | $a_4$ | $a_6$ | $a_8$ | $a_{10}$ |
|---|---|---|---|---|---|
| 31 | 0.000000E+00 | 1.918407E-03 | -1.162800E-04 | -2.850000E-07 | 0.000000E+00 |
| 32 | 0.000000E+00 | -2.265833E-03 | -1.350730E-04 | 5.795700E-05 | 0.000000E+00 |
| 41 | 0.000000E+00 | -1.778693E-02 | 9.488710E-04 | -2.540230E-04 | 0.000000E+00 |
| 42 | 0.000000E+00 | 3.418807E-03 | 8.946190E-04 | -2.897150E-04 | 5.695800E-05 |
| 61 | 0.000000E+00 | -1.425479E-01 | -2.680490E-04 | -7.846667E-03 | 0.000000E+00 |
| 62 | 0.000000E+00 | -8.709963E-02 | 1.367010E-02 | -2.720101E-03 | 2.613590E-04 |

FIG. 37

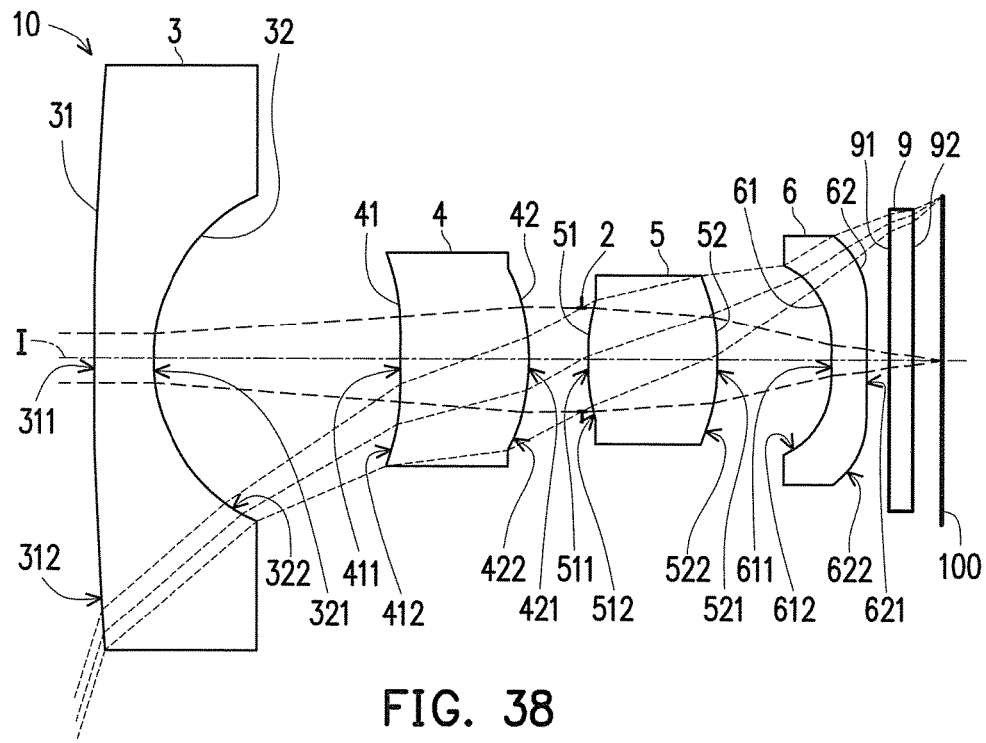
FIG. 38
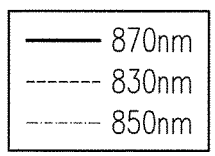
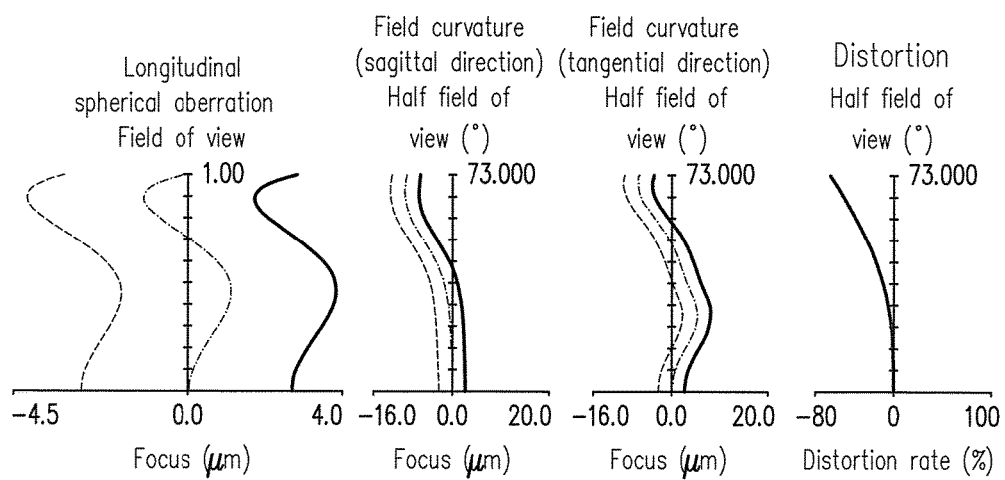
FIG. 39A   FIG. 39B   FIG. 39C   FIG. 39D

| Ninth embodiment ||||||
|---|---|---|---|---|---|
| Effective focal length=1.880 mm , Half field of view (HFOV)=73.000°, Fno=2.80, System length=10.910 mm ||||||
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 48.061 | 0.752 | 1.544 | 55.959 | -4.465 |
| | Image-side surface 32 | 2.270 | 3.188 | | | |
| Second lens element 4 | Object-side surface 41 | -8.104 | 1.654 | 1.544 | 55.959 | 6.717 |
| | Image-side surface 42 | -2.673 | 0.673 | | | |
| Aperture stop 2 | | Infinity | 0.098 | | | |
| Third lens element 5 | Object-side surface 51 | 3.240 | 1.654 | 1.517 | 64.198 | 3.412 |
| | Image-side surface 52 | -3.110 | 1.482 | | | |
| Fourth lens element 6 | Object-side surface 61 | -4.528 | 0.451 | 1.661 | 20.401 | -4.468 |
| | Image-side surface 62 | 7.997 | 0.287 | | | |
| Cover glass 9 | Object-side surface 91 | Infinity | 0.300 | 1.517 | 64.167 | |
| | Image-side surface 92 | Infinity | 0.370 | | | |
| | Image plane 100 | Infinity | | | | |

FIG. 40

| Sur-face | K | $a_4$ | $a_6$ | $a_8$ | $a_{10}$ |
|---|---|---|---|---|---|
| 31 | 0.000000E+00 | 1.738740E-04 | -7.087000E-06 | -3.770000E-07 | 0.000000E+00 |
| 32 | 0.000000E+00 | -4.315456E-03 | 1.718180E-04 | -9.748200E-05 | 0.000000E+00 |
| 41 | 0.000000E+00 | -2.442776E-02 | 2.680796E-03 | -1.130860E-04 | 0.000000E+00 |
| 42 | 0.000000E+00 | 4.283203E-03 | 2.453255E-03 | -8.054760E-04 | 7.298200E-05 |
| 51 | 0.000000E+00 | -5.480910E-04 | 2.671726E-03 | -6.292211E-03 | 0.000000E+00 |
| 52 | 0.000000E+00 | -5.055141E-03 | 8.638900E-04 | -2.055849E-03 | 0.000000E+00 |
| 61 | 0.000000E+00 | -1.839452E-01 | 1.928438E-02 | -1.551309E-02 | 0.000000E+00 |
| 62 | 0.000000E+00 | -1.181265E-01 | 2.334289E-02 | -6.011828E-03 | 6.320390E-04 |

FIG. 41

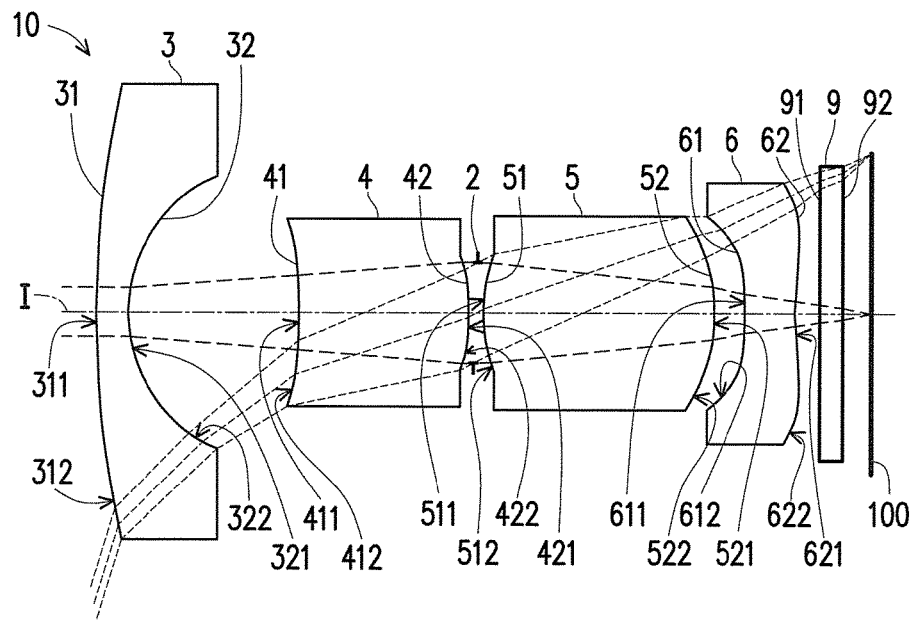
FIG. 42
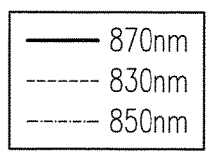
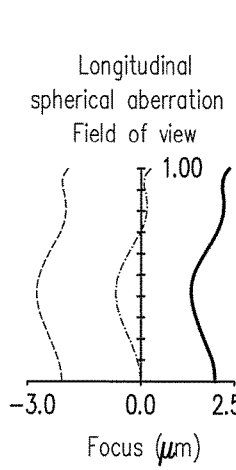
Longitudinal
spherical aberration
Field of view
FIG. 43A
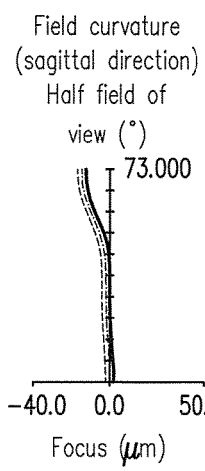
Field curvature
(sagittal direction)
Half field of
view (°)
FIG. 43B
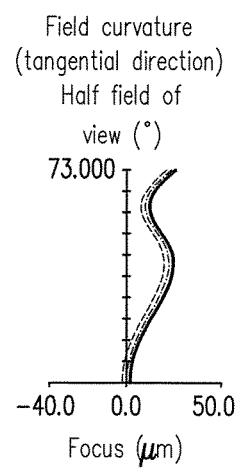
Field curvature
(tangential direction)
Half field of
view (°)
FIG. 43C
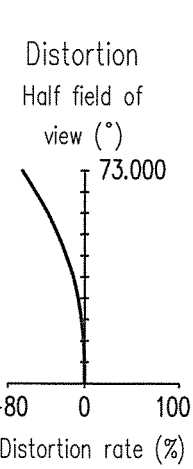
Distortion
Half field of
view (°)
FIG. 43D

| \multicolumn{6}{c|}{Tenth embodiment} |
|---|---|---|---|---|---|---|
| \multicolumn{6}{l|}{Effective focal length=1.868 mm, Half field of view (HFOV)=73.000°, Fno=2.80, System length=10.377 mm} |
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 16.376 | 0.429 | 1.544 | 55.959 | -4.389 |
| | Image-side surface 32 | 2.047 | 2.280 | | | |
| Second lens element 4 | Object-side surface 41 | -7.291 | 2.292 | 1.544 | 55.959 | 6.190 |
| | Image-side surface 42 | -2.540 | 0.100 | | | |
| Aperture stop 2 | | Infinity | 0.100 | | | |
| Third lens element 5 | Object-side surface 51 | 2.627 | 3.077 | 1.517 | 64.198 | 6.101 |
| | Image-side surface 52 | -2.400 | 0.417 | | | |
| Fourth lens element 6 | Object-side surface 61 | -6.823 | 0.673 | 1.661 | 20.401 | -3.488 |
| | Image-side surface 62 | 3.451 | 0.338 | | | |
| Cover glass 9 | Object-side surface 91 | Infinity | 0.300 | 1.517 | 64.167 | |
| | Image-side surface 92 | Infinity | 0.370 | | | |
| | Image plane 100 | Infinity | | | | |

FIG. 44

| Surface | K | $a_4$ | $a_6$ | $a_8$ | $a_{10}$ |
|---|---|---|---|---|---|
| 31 | 0.000000E+00 | 2.226053E-03 | -1.928680E-04 | 3.040000E-07 | 0.000000E+00 |
| 32 | 0.000000E+00 | 5.041630E-04 | 8.914460E-04 | 1.492110E-04 | 0.000000E+00 |
| 41 | 0.000000E+00 | -1.884177E-02 | 9.855530E-04 | -5.500890E-04 | 0.000000E+00 |
| 42 | 0.000000E+00 | 3.166008E-03 | 2.839655E-03 | -8.337201E-03 | 6.653608E-03 |
| 51 | 0.000000E+00 | 9.014660E-04 | -2.812943E-03 | -3.335990E-04 | 0.000000E+00 |
| 52 | 0.000000E+00 | -1.598491E-02 | 6.632281E-03 | 1.334460E-04 | 0.000000E+00 |
| 61 | 0.000000E+00 | -1.651622E-01 | 1.485911E-02 | 1.117163E-03 | 0.000000E+00 |
| 62 | 0.000000E+00 | -1.125845E-01 | 2.640484E-02 | -4.579443E-03 | 3.215420E-04 |

FIG. 45

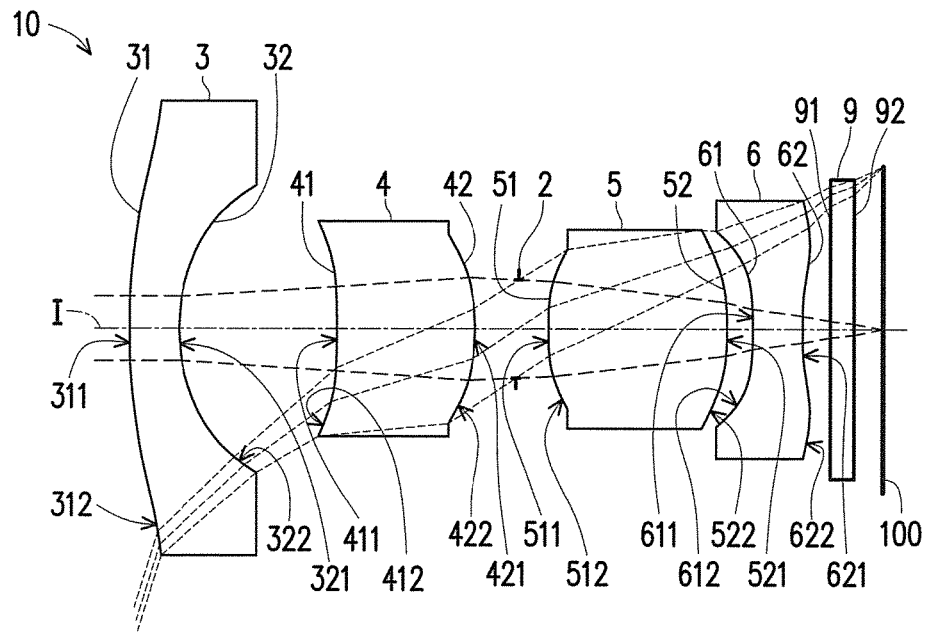
FIG. 46
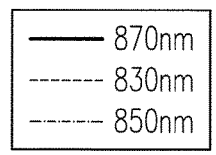
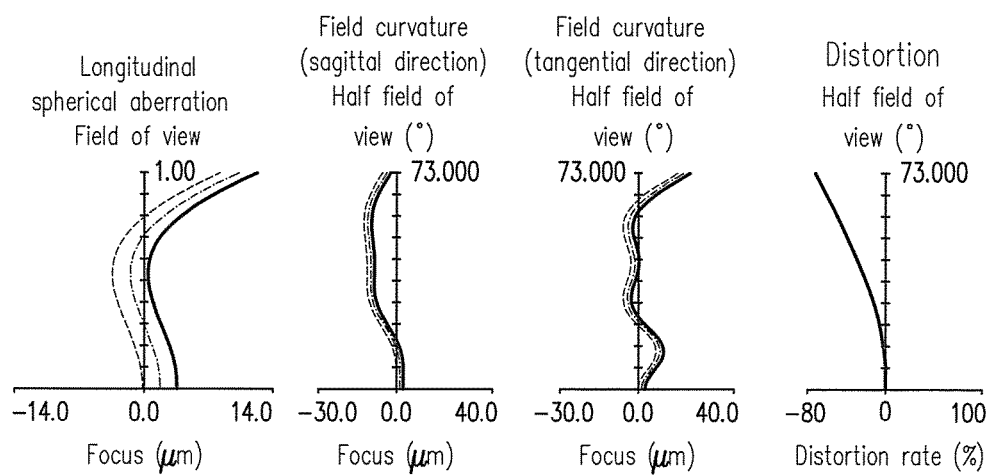
FIG. 47A    FIG. 47B    FIG. 47C    FIG. 47D

| Eleventh embodiment ||||||
|---|---|---|---|---|---|
| Effective focal length=2.512 mm , Half field of view (HFOV)=73.000°, Fno=2.80, System length=10.243 mm ||||||
| Lens element | Surface | Radius of curvature(mm) | Thickness(mm) | Refractive index | Abbe number | Focal length(mm) |
| Object | | Infinity | Infinity | | | |
| First lens element 3 | Object-side surface 31 | 8.836 | 0.685 | 1.544 | 55.959 | -7.575 |
| | Image-side surface 32 | 2.716 | 2.151 | | | |
| Second lens element 4 | Object-side surface 41 | -7.211 | 1.878 | 1.544 | 55.959 | 6.037 |
| | Image-side surface 42 | -2.445 | 0.596 | | | |
| Aperture stop 2 | | Infinity | 0.403 | | | |
| Third lens element 5 | Object-side surface 51 | 2.478 | 2.440 | 1.517 | 64.198 | 3.014 |
| | Image-side surface 52 | -2.698 | 0.346 | | | |
| Fourth lens element 6 | Object-side surface 61 | -5.213 | 0.678 | 1.661 | 20.401 | -2.909 |
| | Image-side surface 62 | 3.047 | 0.399 | | | |
| Cover glass 9 | Object-side surface 91 | Infinity | 0.300 | 1.517 | 64.167 | |
| | Image-side surface 92 | Infinity | 0.367 | | | |
| | Image plane 100 | Infinity | | | | |

FIG. 48

| Surface | K | $a_4$ | $a_6$ | $a_8$ | $a_{10}$ |
|---|---|---|---|---|---|
| 31 | 0.000000E+00 | 1.003973E-03 | -2.897150E-04 | 3.566000E-06 | 0.000000E+00 |
| 32 | 0.000000E+00 | 7.797811E-03 | 2.349700E-05 | 5.314250E-04 | 0.000000E+00 |
| 41 | 0.000000E+00 | -1.657726E-02 | -2.181740E-03 | -4.719000E-04 | 0.000000E+00 |
| 42 | 0.000000E+00 | -1.637014E-03 | 5.036040E-03 | -3.277901E-03 | 9.038560E-04 |
| 61 | 0.000000E+00 | -1.306118E-01 | 2.104391E-02 | -1.776267E-03 | 0.000000E+00 |
| 62 | 0.000000E+00 | -1.051712E-01 | 2.089480E-02 | -2.213104E-03 | 1.560170E-04 |

FIG. 49

| Conditional expression | First embodiment | Second embodiment | Third embodiment | Fourth embodiment | Fifth embodiment |
|---|---|---|---|---|---|
| T1 | 0.475 | 0.469 | 0.522 | 0.684 | 0.684 |
| G12 | 2.025 | 2.148 | 2.043 | 3.938 | 2.910 |
| T2 | 2.734 | 3.011 | 2.740 | 1.504 | 1.810 |
| G23 | 0.964 | 0.944 | 1.001 | 0.875 | 0.998 |
| T3 | 2.550 | 2.430 | 2.529 | 1.759 | 1.506 |
| G34 | 0.588 | 0.548 | 0.581 | 1.016 | 0.959 |
| T4 | 0.514 | 0.560 | 0.508 | 0.714 | 0.973 |
| BFL | 0.968 | 0.963 | 0.971 | 0.969 | 0.955 |
| EFL | 1.861 | 1.803 | 1.698 | 1.827 | 1.843 |
| TTL | 10.817 | 11.073 | 10.895 | 11.458 | 10.796 |
| ALT | 6.272 | 6.470 | 6.299 | 4.661 | 4.974 |
| AAG | 3.577 | 3.640 | 3.626 | 5.828 | 4.867 |
| ALT/(G12+G34) | 2.400 | 2.400 | 2.400 | 0.941 | 1.286 |
| T2/G34 | 4.649 | 5.500 | 4.715 | 1.481 | 1.887 |
| TTL/(G34+T4) | 9.819 | 10.000 | 10.000 | 6.624 | 5.586 |
| (G12+G23)/T2 | 1.093 | 1.027 | 1.111 | 3.200 | 2.159 |
| EFL/G34 | 3.165 | 3.293 | 2.922 | 1.799 | 1.921 |
| ALT/(T1+T4) | 6.345 | 6.289 | 6.115 | 3.335 | 3.000 |
| (T2+T3)/G23 | 5.481 | 5.764 | 5.264 | 3.729 | 3.323 |
| AAG/T1 | 7.535 | 7.760 | 6.950 | 8.526 | 7.111 |
| (T3+T4)/G34 | 5.210 | 5.460 | 5.227 | 2.435 | 2.584 |
| AAG/G23 | 3.711 | 3.856 | 3.622 | 6.661 | 4.877 |
| EFL//T1 | 3.920 | 3.844 | 3.255 | 2.673 | 2.693 |
| T3/T1 | 5.371 | 5.180 | 4.848 | 2.573 | 2.200 |
| (T1+T2)/G23 | 3.328 | 3.687 | 3.258 | 2.500 | 2.500 |
| T2/T1 | 5.758 | 6.420 | 5.252 | 2.200 | 2.645 |
| ALT/T1 | 13.210 | 13.793 | 12.075 | 6.818 | 7.267 |

FIG. 50

| Conditional expression | Sixth embodiment | Seventh embodiment | Eighth embodiment | Ninth embodiment | Tenth embodiment | Eleventh embodiment |
|---|---|---|---|---|---|---|
| T1 | 0.421 | 0.738 | 0.532 | 0.752 | 0.429 | 0.685 |
| G12 | 1.808 | 1.912 | 2.187 | 3.188 | 2.280 | 2.151 |
| T2 | 2.106 | 2.526 | 2.604 | 1.654 | 2.292 | 1.878 |
| G23 | 1.011 | 0.889 | 1.170 | 0.771 | 0.200 | 0.999 |
| T3 | 0.926 | 2.126 | 2.215 | 1.654 | 3.077 | 2.440 |
| G34 | 1.666 | 0.888 | 0.737 | 1.482 | 0.417 | 0.346 |
| T4 | 0.482 | 0.633 | 0.638 | 0.451 | 0.673 | 0.678 |
| BFL | 0.951 | 0.967 | 0.965 | 0.958 | 1.008 | 1.065 |
| EFL | 1.883 | 1.845 | 1.773 | 1.880 | 1.868 | 2.512 |
| TTL | 9.371 | 10.679 | 11.048 | 10.910 | 10.377 | 10.243 |
| ALT | 3.936 | 6.024 | 5.989 | 4.511 | 6.471 | 5.681 |
| AAG | 4.485 | 3.689 | 4.094 | 5.441 | 2.896 | 3.496 |
| ALT/(G12+G34) | 1.133 | 2.151 | 2.048 | 0.966 | 2.400 | 2.275 |
| T2/G34 | 1.264 | 2.844 | 3.535 | 1.116 | 5.500 | 5.420 |
| TTL/(G34+T4) | 4.363 | 7.019 | 8.035 | 5.645 | 9.520 | 9.997 |
| (G12+G23)/T2 | 1.338 | 1.109 | 1.289 | 2.394 | 1.082 | 1.677 |
| EFL/G34 | 1.130 | 2.078 | 2.407 | 1.269 | 4.483 | 7.250 |
| ALT/(T1+T4) | 4.358 | 4.392 | 5.118 | 3.750 | 5.868 | 4.168 |
| (T2+T3)/G23 | 3.000 | 5.233 | 4.119 | 4.291 | 26.843 | 4.323 |
| AAG/T1 | 10.649 | 5.000 | 7.695 | 7.237 | 6.744 | 5.105 |
| (T3+T4)/G34 | 0.845 | 3.108 | 3.873 | 1.421 | 9.000 | 9.000 |
| AAG/G23 | 4.436 | 4.150 | 3.499 | 7.057 | 14.482 | 3.500 |
| EFL//T1 | 4.471 | 2.500 | 3.333 | 2.501 | 4.349 | 3.668 |
| T3/T1 | 2.200 | 2.882 | 4.163 | 2.200 | 7.164 | 3.563 |
| (T1+T2)/G23 | 2.500 | 3.671 | 2.681 | 3.121 | 13.606 | 2.566 |
| T2/T1 | 5.001 | 3.423 | 4.895 | 2.200 | 5.336 | 2.742 |
| ALT/T1 | 9.346 | 8.164 | 11.258 | 6.000 | 15.068 | 8.295 |

FIG. 51

OPTICAL IMAGING LENS

CROSS-REFERENCE TO RELATED APPLICATION

This application claims the priority benefit of China application serial no. 201610522854.5, filed on Jul. 5, 2016. The entirety of the above-mentioned patent application is hereby incorporated by reference herein and made a part of this specification.

BACKGROUND OF THE INVENTION

1. Field of the Invention

The invention relates to an optical lens, and particularly relates to an optical imaging lens.

2. Description of Related Art

In recent years, as use of portable electronic devices (e.g., mobile phones and digital cameras) becomes ubiquitous, techniques related to producing image modules have also been developed significantly, wherein the image module mainly includes an optical imaging lens, a module holder unit and a sensor, and the demand for minimized image module increases due to the compact and slim design of mobile phones and digital cameras. Moreover, as dimensions of a charged coupled device (CCD) and complementary metal-oxide semiconductor (CMOS) are reduced and significant progress is made in related technology, the length of optical imaging lens in the image module is correspondingly reduced. However, in order to avoid reduction in optical performance and quality, good optical properties should also be achieved while the length of optical imaging lens is shortened. Image quality and image volume are two of the most important characteristics for an optical imaging lens.

On the other hand, the specification of portable electronic products (such as cell phone, cameras, tablet PC, personal digital assistant, photographic device used in car, etc.) is ever-changing, and the key components, i.e. optical imaging lens, is also developed diversely. Besides, in the application of the well-developed virtual reality (VR) tracker, the specification of optical imaging lens having good and stable optical properties needs to be designed, and the development of the optical imaging lens having a larger field of view becomes a prior development item.

In terms of the lens structure having four lens elements, how to produce an optical imaging lens that meets requirements of consumer electronic products and has an improved image quality, an excellent field of view and a shortened length is always a goal in the industry and academy.

SUMMARY OF THE INVENTION

The invention provides an optical imaging lens having a larger field of view and having good and stable optical properties while the length of lens system is shortened.

An embodiment of the invention provides an optical imaging lens including a first lens element, a second lens element, an aperture stop, a third lens element, and a fourth lens element arranged in sequence from an object side to an image side along an optical axis, and each of the first lens element to the fourth lens element includes an object-side surface that faces the object side and allows imaging rays to pass through and an image-side surface that faces the image side and allows the imaging rays to pass through. The first lens element has negative refracting power. The object-side surface of the second lens element has a concave portion in a vicinity of the optical axis. The image-side surface of the fourth lens element has a convex portion in a vicinity of a periphery of the fourth lens element. A quantity of lens elements having refracting power of the optical imaging lens is only four, and the optical imaging lens satisfies: $ALT/(G12+G34) \leq 2.4$, wherein ALT is a sum of four thicknesses of the first lens element, the second lens element, the third lens element, and the fourth lens element along the optical axis, $G12$ is an air gap from the first lens element to the second lens element along the optical axis, and $G34$ is an air gap from the third lens element to the fourth lens element along the optical axis.

Based on the above, in the embodiments of the invention, the optical imaging lens can bring the following advantageous effect: with the first lens element having negative refracting power and the aperture stop located between the second lens element and the third lens element, under the circumstances where the field of view of the optical imaging lens is enlarged. Besides, the object-side surface of the second lens element faces the object side and has a concave portion in a vicinity of the optical axis, and the image-side surface of the fourth lens element faces the image side and has a convex portion in a vicinity of a periphery of the fourth lens element. Based on the design abovementioned, the system aberration, the field curvature aberration and the distortion aberration are reduced, and the optical imaging lens has good optical properties and provides good image quality.

In order to make the aforementioned and other features and advantages of the invention more comprehensible, embodiments accompanying figures are described in detail belows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic view illustrating a surface structure of a lens element.

FIG. 2 is a schematic view illustrating a concave and convex surface structure of a lens element and a ray focal point.

FIG. 3 is a schematic view illustrating a surface structure of a lens element according to a first example.

FIG. 4 is a schematic view illustrating a surface structure of a lens element according to a second example.

FIG. 5 is a schematic view illustrating a surface structure of a lens element according to a third example.

FIG. 6 is a schematic view illustrating an optical imaging lens according to a first embodiment of the invention.

FIGS. 7A to 7D are diagrams illustrating longitudinal spherical aberration and other aberrations of the optical imaging lens according to the first embodiment of the invention.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 10 is a schematic view illustrating an optical imaging lens according to a second embodiment of the invention.

FIGS. 11A to 11D are diagrams illustrating longitudinal spherical aberration and other aberrations of the optical imaging lens according to the second embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 14 is a schematic view illustrating an optical imaging lens according to a third embodiment of the invention.

FIGS. 15A to 15D are diagrams illustrating longitudinal spherical aberration and other aberrations of the optical imaging lens according to the third embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 18 is a schematic view illustrating an optical imaging lens according to a fourth embodiment of the invention.

FIGS. 19A to 19D are diagrams illustrating longitudinal spherical aberration and other aberrations of the optical imaging lens according to the fourth embodiment of the invention.

FIG. 20 shows detailed optical data pertaining to the optical imaging lens according to the fourth embodiment of the invention.

FIG. 21 shows aspheric parameters pertaining to the optical imaging lens according to the fourth embodiment of the invention.

FIG. 22 is a schematic view illustrating an optical imaging lens according to a fifth embodiment of the invention.

FIGS. 23A to 23D are diagrams illustrating longitudinal spherical aberration and other aberrations of the optical imaging lens according to the fifth embodiment of the invention.

FIG. 24 shows detailed optical data pertaining to the optical imaging lens according to the fifth embodiment of the invention.

FIG. 25 shows aspheric parameters pertaining to the optical imaging lens according to the fifth embodiment of the invention.

FIG. 26 is a schematic view illustrating an optical imaging lens according to a sixth embodiment of the invention.

FIGS. 27A to 27D are diagrams illustrating longitudinal spherical aberration and other aberrations of the optical imaging lens according to the sixth embodiment of the invention.

FIG. 28 shows detailed optical data pertaining to the optical imaging lens according to the sixth embodiment of the invention.

FIG. 29 shows aspheric parameters pertaining to the optical imaging lens according to the sixth embodiment of the invention.

FIG. 30 is a schematic view illustrating an optical imaging lens according to a seventh embodiment of the invention.

FIGS. 31A to 31D are diagrams illustrating longitudinal spherical aberration and other aberrations of the optical imaging lens according to the seventh embodiment of the invention.

FIG. 32 shows detailed optical data pertaining to the optical imaging lens according to the seventh embodiment of the invention.

FIG. 33 shows aspheric parameters pertaining to the optical imaging lens according to the seventh embodiment of the invention.

FIG. 34 is a schematic view illustrating an optical imaging lens according to an eighth embodiment of the invention.

FIGS. 35A to 35D are diagrams illustrating longitudinal spherical aberration and other aberrations of the optical imaging lens according to the eighth embodiment of the invention.

FIG. 36 shows detailed optical data pertaining to the optical imaging lens according to the eighth embodiment of the invention.

FIG. 37 shows aspheric parameters pertaining to the optical imaging lens according to the eighth embodiment of the invention.

FIG. 38 is a schematic view illustrating an optical imaging lens according to a ninth embodiment of the invention.

FIGS. 39A to 39D are diagrams illustrating longitudinal spherical aberration and other aberrations of the optical imaging lens according to the ninth embodiment of the invention.

FIG. 40 shows detailed optical data pertaining to the optical imaging lens according to the ninth embodiment of the invention.

FIG. 41 shows aspheric parameters pertaining to the optical imaging lens according to the ninth embodiment of the invention.

FIG. 42 is a schematic view illustrating an optical imaging lens according to a tenth embodiment of the invention.

FIGS. 43A to 43D are diagrams illustrating longitudinal spherical aberration and other aberrations of the optical imaging lens according to the tenth embodiment of the invention.

FIG. 44 shows detailed optical data pertaining to the optical imaging lens according to the tenth embodiment of the invention.

FIG. 45 shows aspheric parameters pertaining to the optical imaging lens according to the tenth embodiment of the invention.

FIG. 46 is a schematic view illustrating an optical imaging lens according to an eleventh embodiment of the invention.

FIGS. 47A to 47D are diagrams illustrating longitudinal spherical aberration and other aberrations of the optical imaging lens according to the eleventh embodiment of the invention.

FIG. 48 shows detailed optical data pertaining to the optical imaging lens according to the eleventh embodiment of the invention.

FIG. 49 shows aspheric parameters pertaining to the optical imaging lens according to the eleventh embodiment of the invention.

FIG. 50 shows important parameters and relation values thereof pertaining to the optical imaging lens according to the first through the fifth embodiments of the invention.

FIG. 51 shows important parameters and relation values thereof pertaining to the optical imaging lens according to the sixth through the eleventh embodiments of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0-50% of the effective radius (radius of the clear aperture) of the surface, whereas the portion in a vicinity of a periphery of the lens element is defined as the portion between 50-100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0-50% of the effective radius (radius of the clear aperture) is determined as the portion in a vicinity of the optical axis, and the portion between 50-100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic view illustrating an optical imaging lens according to a first embodiment of the invention, and FIGS. 7A to 7D are diagrams illustrating longitudinal spherical aberration and other aberrations of the optical imaging lens according to the first embodiment of the invention. Referring to FIG. 6, an optical imaging lens 10 in the first embodiment of the invention includes a first lens element 3, a second lens element 4, an aperture stop 2, a third lens element 5, a fourth lens element 6 and a cover glass 9 arranged in sequence from an object side to an image side along an optical axis I of the optical imaging lens 10. When rays emitted from an object to be shot enter the optical imaging lens 10, the rays pass through the first lens element 3, the second lens element 4, the aperture stop 2, the third lens element 5, the fourth lens element 6 and the cover glass 9, so as to form an image on an image plane 100. It should be added that the object side is a side facing the object to be shot, and the image side is a side facing the image plane 100.

The first lens element 3, the second lens element 4, the third lens element 5, the fourth lens element 6, and the cover glass 9 respectively have object-side surfaces 31, 41, 51, 61, and 91 facing the object side and allowing imaging rays to pass through, and respectively have image-side surfaces 32, 42, 52, 62, and 92 facing the image side and allowing the imaging rays to pass through.

In the present embodiment, the first lens element 3 through the fourth lens element 6 have refracting power. In addition, the first lens element 3, the second lens element 4 and the fourth lens elements 6 are formed of plastic material, and the third lens element 5 is formed of glass. Since the third lens element 5 is formed of glass, the imaging quality of the optical imaging lens 10 has better thermal stability. However, the invention provides no limitation to the material of the first lens element 3 through the fourth lens element 6.

The first lens element 3 has negative refracting power. The object-side surface 31 of the first lens element 3 is a convex surface, and has a convex portion 311 in a vicinity of the optical axis I and a convex portion 312 in a vicinity of a periphery of the first lens element 3. The image-side surface 32 of the first lens element 3 is a concave surface, and has a concave portion 321 in a vicinity of the optical axis I and a concave portion 322 in a vicinity of the periphery of the first lens element 3. In the present embodiment, the object-side surface 31 and the image-side surface 32 of the first lens element 3 are both aspheric surfaces.

The second lens element 4 has positive refracting power. The object-side surface 41 of the second lens element 4 is a concave surface, and has a concave portion 411 in a vicinity of the optical axis I and a concave portion 412 in a vicinity of a periphery of the second lens element 4. The image-side surface 42 of the second lens element 4 is a convex surface, and has a convex portion 421 in a vicinity of the optical axis I and a convex portion 422 in a vicinity of the periphery of the second lens element 4. In the present embodiment, the object-side surface 41 and the image-side surface 42 of the second lens element 4 are both aspheric surfaces.

The third lens element 5 has positive refracting power. The object-side surface 51 of the third lens element 5 is a convex surface, and has a convex portion 511 in a vicinity of the optical axis I and a convex portion 512 in a vicinity of a periphery of the third lens element 5. The image-side surface 52 of the third lens element 5 is a convex surface, and has a convex portion 521 in a vicinity of the optical axis I and a convex portion 522 in a vicinity of the periphery of the third lens element 5. In the present embodiment, the object-side surface 51 and the image-side surface 52 of the third lens element 5 are both aspheric surfaces.

The fourth lens element 6 has negative refracting power. The object-side surface 61 of the fourth lens element 6 is a concave surface, and has a concave portion 611 in a vicinity of the optical axis I and a concave portion 612 in a vicinity of a periphery of the fourth lens element 6. The image-side surface 62 of the fourth lens element 6 has a concave portion 621 in a vicinity of the optical axis I and a convex portion 622 in a vicinity of the periphery of the fourth lens element 6. In the present embodiment, the object-side surface 61 and the image-side surface 62 of the fourth lens element 6 are both aspheric surfaces.

The detailed optical data in the first embodiment is described in FIG. 8. In the first embodiment, the effective focal length (EFL) of the total system (i.e. the whole optical imaging lens 10) is 1.861 mm, the half field of view (HFOV) thereof is 73.000°, the f-number (Fno) thereof is 2.80, and the system length of the total system is 10.817 mm. Wherein, the system length refers to a distance from the object-side surface 31 of the first lens element 3 to the image plane 100 along the optical axis I.

In addition, in the embodiment, a total of eight surfaces, namely the object-side surfaces 31, 41, 51, and 61 and the image-side surfaces 32, 42, 52, and 62 of the first lens element 3, the second lens element 4, the third lens element 5, and the fourth lens element 6 are aspheric surfaces. The aspheric surfaces are defined by the following formula.

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \quad (1)$$

wherein:
R: radius of curvature of the surface of the lens element near the optical axis I;
Z: a depth of the aspheric surface (i.e. a perpendicular distance between the point on the aspheric surface that is spaced by the distance Y from the optical axis I and a tangent plane tangent to a vertex of the aspheric surface on the optical axis I);

Y: a distance from a point on an aspheric curve to the optical axis I;

K: conic constant;

$a_{2i}$: 2ith aspheric coefficient.

The aspheric coefficients of the object-side surface 31 of the first lens element 3 through the image-side surface 62 of the fourth lens element 6 in the formula (1) are shown in FIG. 9. Wherein the column reference number 31 in FIG. 9 represents the aspheric coefficient of the object-side surface 31 of the first lens element 3 and so forth.

In addition, the relations among important parameters pertaining to the optical imaging lens 10 in the first embodiment are shown in FIG. 50.

wherein,

T1 represents a thickness of the first lens element 3 along the optical axis I;

T2 represents a thickness of the second lens element 4 along the optical axis I;

T3 represents a thickness of the third lens element 5 along the optical axis I;

T4 represents a thickness of the fourth lens element 6 along the optical axis I;

G12 represents an air gap between the first lens element 3 and the second lens element 4 along the optical axis I;

G23 represents an air gap between the second lens element 4 and the third lens element 5 along the optical axis I;

G34 represents an air gap between the third lens element 5 and the fourth lens element 6 along the optical axis I;

AAG represents a sum of three air gaps from the first lens element 3 to the fourth lens element 6 along the optical axis I;

ALT represents a sum of four thicknesses of the first lens element 3, the second lens element 4, the third lens element 5, and the fourth lens element 6 along the optical axis I;

EFL represents an effective focal length of the optical imaging lens 10.

BFL represents a distance from the image-side surface 62 of the fourth lens element 6 to the image plane 100 along the optical axis I; and TTL represents a distance from the object-side surface 31 of the first lens element 3 to the image plane 100 of the optical imaging lens 10 along the optical axis I;

In addition, it is defined that:

V1 is an Abbe number of the first lens element 3;

V2 is an Abbe number of the second lens element 4;

V3 is an Abbe number of the third lens element 5;

V4 is an Abbe number of the fourth lens element 6.

G4F represents an air gap between the fourth lens element 6 and the cover glass 9 along the optical axis I;

GFP represents an air gap between the cover glass 9 and the image plane 100 along the optical axis I; and TF represents a thickness of the cover glass 9 along the optical axis I.

Further referring to FIGS. 7A to 7D, FIG. 7A illustrates the longitudinal spherical aberration of the first embodiment, FIGS. 7B to 7C are diagrams respectively illustrating field curvature aberration regarding sagittal direction on the image plane 100 and field curvature aberration regarding the tangential direction on the image plane 100 in the first embodiment, and FIG. 7D is a diagram illustrating distortion aberration on the image plane 100 in the first embodiment. The longitudinal spherical aberration of the first embodiment shown in FIG. 7A is simulated in the condition that the pupil radius is 0.3323 mm. Otherwise, in FIG. 7A which describes the longitudinal spherical aberration in the first embodiment, the curve of each wavelength is close to one another and near the middle position, which shows that the off-axis ray of each wavelength at different heights are focused near the imaging point. The skew margin of the curve of each wavelength shows that the imaging point deviation of the off-axis ray at different heights is controlled within +4.0 μm. Accordingly, it is evident that the embodiment can significantly improve the spherical aberration of the same wavelength. In addition, the curves of the three representative wavelengths 830 nm, 850 nm, and 870 nm are close to one another, which represents that the imaging positions of the rays with different wavelengths are concentrated, therefore, the chromatic aberration can be significantly improved.

In FIGS. 7B and 7C which illustrate two diagrams of field curvature aberration, the focal length variation of the three representative wavelengths in the entire field of view falls within ±20 μm, which represents that the optical system in the first embodiment can effectively eliminate aberration. In FIG. 7D, the diagram of distortion aberration shows that the distortion aberration in the first embodiment can be maintained within ±70%, which shows that the distortion aberration in the first embodiment can meet the image quality requirement of the optical system. Based on the above, it is shown that the first embodiment can provide better image quality compared with existing optical lens under the condition where the system length of the optical lens is shortened to about 10.817 mm. Therefore, the first embodiment can have shorter lens length and broader shooting angle while maintaining good optical properties to realize slim design of product with broadened view angle.

FIG. 10 is a schematic view illustrating an optical imaging lens according to a second embodiment of the invention, FIGS. 11A to 11D are diagrams illustrating longitudinal spherical aberration and other aberrations of the optical imaging lens according to the second embodiment of the invention. Referring to FIG. 10, the second embodiment of the optical imaging lens 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 10.

The detailed optical data pertaining to the optical imaging lens 10 is shown in FIG. 12, and the effective focal length of the total system in the second embodiment is 1.803 mm, the HFOV thereof is 73.000°, Fno thereof is 2.80, and the system length thereof is 11.073 mm.

FIG. 13 shows the aspheric coefficients used in the formula (1) of the object-side surface 31 of the first lens element 3 through the image-side surface 62 of the fourth lens element 6 in the second embodiment.

In addition, the relations among important parameters pertaining to the optical imaging lens 10 in the second embodiment are shown in FIG. 50.

The longitudinal spherical aberration of the second embodiment shown in FIG. 11A is simulated in the condition that the pupil radius is 0.3219 mm. According to the longitudinal spherical aberration diagram of the second embodiment shown in FIG. 11A, a deviation of the imaging points of the off-axis rays of different heights is controlled within a range of ±4.5 μm. According to the two field curvature aberration diagrams of FIG. 11B and FIG. 11C, a focal length variation of the three representative wavelengths in the whole field of view falls within ±16 μm. According to the distortion aberration diagram of FIG. 11D, a distortion aberration of the second embodiment is maintained within the range of ±70%. Therefore, compared to the existing optical lens, the second embodiment may also achieve the good optical performance under a condition that the system length is reduced to about 11.073 mm.

According to the above description, compared to the first embodiment, the advantages of the second embodiment are as follows. The range of field curvature aberration regarding the sagittal direction in the second embodiment is smaller than the range of field curvature aberration regarding the sagittal direction in the first embodiment. In addition, the optical imaging lens of the second embodiment is easier to be fabricated compared to that of the first embodiment, so that a production yield is relatively high.

FIG. 14 is a schematic view illustrating an optical imaging lens according to a third embodiment of the invention, FIGS. 15A to 15D are diagrams illustrating longitudinal spherical aberration and other aberrations of the optical imaging lens according to the third embodiment of the invention. Referring to FIG. 14, the third embodiment of the optical imaging lens 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 14.

The detailed optical data pertaining to the optical imaging lens 10 is shown in FIG. 16, and the effective focal length of the total system in the third embodiment is 1.698 mm, the HFOV thereof is 73.000°, Fno thereof is 2.80, and the system length thereof is 10.895 mm.

In the third embodiment, the object-side surfaces 31, 41, and 61 and the image-side surfaces 32, 42, and 62 of the first lens element 3, the second lens element 4, and the fourth lens element 6 are aspheric surfaces, and the object-side surface 51 and the image-side surface 52 of the third lens element 5 are spherical surfaces. FIG. 17 shows the aspheric coefficients used in the formula (1) of the object-side surfaces 31, 41, and 61 and the image-side surfaces 32, 42, and 62 of the first lens element 3, the second lens element 4, and the fourth lens element 6 in the third embodiment.

In addition, the relations among important parameters pertaining to the optical imaging lens 10 in the third embodiment are shown in FIG. 50.

The longitudinal spherical aberration of the third embodiment shown in FIG. 15A is simulated in the condition that the pupil radius is 0.3033 mm. According to the longitudinal spherical aberration diagram of the third embodiment shown in FIG. 15A, a deviation of the imaging points of the off-axis rays of different heights is controlled within a range of ±5.0 μm. According to the two field curvature aberration diagrams of FIG. 15B and FIG. 15C, a focal length variation of the three representative wavelengths in the whole field of view falls within ±16 μm. According to the distortion aberration diagram of FIG. 15D, a distortion aberration of the third embodiment is maintained within the range of ±70%. Therefore, compared to the existing optical lens, the third embodiment may also achieve the good optical performance under a condition that the system length is reduced to about 10.895 mm.

According to the above description, compared to the first embodiment, the advantages of the third embodiment are as follows. The range of field curvature aberration regarding the sagittal direction in the third embodiment is smaller than the range of field curvature aberration regarding the sagittal direction in the first embodiment. In addition, the optical imaging lens of the third embodiment is easier to be fabricated compared to that of the first embodiment, so that a production yield is relatively high.

FIG. 18 is a schematic view illustrating an optical imaging lens according to a fourth embodiment of the invention, FIGS. 19A to 19D are diagrams illustrating longitudinal spherical aberration and other aberrations of the optical imaging lens according to the fourth embodiment of the invention. Referring to FIG. 18, the fourth embodiment of the optical imaging lens 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 18.

The detailed optical data pertaining to the optical imaging lens 10 is shown in FIG. 20, and the effective focal length of the total system in the fourth embodiment is 1.827 mm, the HFOV thereof is 73.000°, Fno thereof is 2.80, and the system length thereof is 11.458 mm.

FIG. 21 shows the aspheric coefficients used in the formula (1) of the object-side surface 31 of the first lens element 3 through the image-side surface 62 of the fourth lens element 6 in the fourth embodiment.

In addition, the relations among important parameters pertaining to the optical imaging lens 10 in the fourth embodiment are shown in FIG. 50.

The longitudinal spherical aberration of the fourth embodiment shown in FIG. 19A is simulated in the condition that the pupil radius is 0.3262 mm. According to the longitudinal spherical aberration diagram of the fourth embodiment shown in FIG. 19A, a deviation of the imaging points of the off-axis rays of different heights is controlled within a range of ±5.0 μm. According to the two field curvature aberration diagrams of FIG. 19B and FIG. 19C, a focal length variation of the three representative wavelengths in the whole field of view falls within ±20 μm. According to the distortion aberration diagram of FIG. 19D, a distortion aberration of the fourth embodiment is maintained within the range of ±70%. Therefore, compared to the existing optical lens, the fourth embodiment may also achieve the good optical performance under a condition that the system length is reduced to about 11.458 mm.

According to the above description, compared to the first embodiment, the advantage of the fourth embodiment is that the optical imaging lens of the fourth embodiment is easier to be fabricated compared to that of the first embodiment, so that a production yield is relatively high.

FIG. 22 is a schematic view illustrating an optical imaging lens according to a fifth embodiment of the invention, FIGS. 23A to 23D are diagrams illustrating longitudinal spherical aberration and other aberrations of the optical imaging lens according to the fifth embodiment of the invention. Referring to FIG. 22, the fifth embodiment of the optical imaging lens 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 22.

The detailed optical data pertaining to the optical imaging lens 10 is shown in FIG. 24, and the effective focal length of the total system in the fifth embodiment is 1.843 mm, the HFOV thereof is 73.000°, Fno thereof is 2.80, and the system length thereof is 10.795 mm.

FIG. 25 shows the aspheric coefficients used in the formula (1) of the object-side surface 31 of the first lens element 3 through the image-side surface 62 of the fourth lens element 6 in the fifth embodiment.

In addition, the relations among important parameters pertaining to the optical imaging lens 10 in the fifth embodiment are shown in FIG. 50.

The longitudinal spherical aberration of the fifth embodiment shown in FIG. 23A is simulated in the condition that the pupil radius is 0.3291 mm. According to the longitudinal spherical aberration diagram of the fifth embodiment shown in FIG. 23A, a deviation of the imaging points of the off-axis rays of different heights is controlled within a range of ±5.0 μm. According to the two field curvature aberration diagrams of FIG. 23B and FIG. 23C, a focal length variation of the three representative wavelengths in the whole field of view falls within ±20 μm. According to the distortion aberration diagram of FIG. 23D, a distortion aberration of the fifth embodiment is maintained within the range of ±70%. Therefore, compared to the existing optical lens, the fifth embodiment may also achieve the good optical performance under a condition that the system length is reduced to about 10.795 mm.

According to the above description, compared to the first embodiment, the advantages of the fifth embodiment are as follows. The system length of the fifth embodiment is shorter than the system length of the first embodiment. In addition, the optical imaging lens of the fifth embodiment is easier to be fabricated compared to that of the first embodiment, so that a production yield is relatively high.

FIG. 26 is a schematic view illustrating an optical imaging lens according to a sixth embodiment of the invention, FIGS. 27A to 27D are diagrams illustrating longitudinal spherical aberration and other aberrations of the optical imaging lens according to the sixth embodiment of the invention. Referring to FIG. 26, the sixth embodiment of the optical imaging lens 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 26.

The detailed optical data pertaining to the optical imaging lens 10 is shown in FIG. 28, and the effective focal length of the total system in the sixth embodiment is 1.883 mm, the HFOV thereof is 73.000°, Fno thereof is 2.80, and the system length thereof is 9.371 mm.

FIG. 29 shows the aspheric coefficients used in the formula (1) of the object-side surface 31 of the first lens element 3 through the image-side surface 62 of the fourth lens element 6 in the sixth embodiment.

In addition, the relations among important parameters pertaining to the optical imaging lens 10 in the sixth embodiment are shown in FIG. 51.

The longitudinal spherical aberration of the sixth embodiment shown in FIG. 27A is simulated in the condition that the pupil radius is 0.3362 mm. According to the longitudinal spherical aberration diagram of the sixth embodiment shown in FIG. 27A, a deviation of the imaging points of the off-axis rays of different heights is controlled within a range of ±4.5 μm. According to the two field curvature aberration diagrams of FIG. 27B and FIG. 27C, a focal length variation of the three representative wavelengths in the whole field of view falls within ±20 μm. According to the distortion aberration diagram of FIG. 27D, a distortion aberration of the sixth embodiment is maintained within the range of ±70%. Therefore, compared to the existing optical lens, the sixth embodiment may also achieve the good optical performance under a condition that the system length is reduced to about 9.371 mm.

According to the above description, compared to the first embodiment, the advantages of the sixth embodiment are as follows. The system length of the sixth embodiment is shorter than the system length of the first embodiment. In addition, the optical imaging lens of the sixth embodiment is easier to be fabricated compared to that of the first embodiment, so that a production yield is relatively high.

FIG. 30 is a schematic view illustrating an optical imaging lens according to a seventh embodiment of the invention, FIGS. 31A to 31D are diagrams illustrating longitudinal spherical aberration and other aberrations of the optical imaging lens according to the seventh embodiment of the invention. Referring to FIG. 30, the seventh embodiment of the optical imaging lens 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 30.

The detailed optical data pertaining to the optical imaging lens 10 is shown in FIG. 32, and the effective focal length of the total system in the seventh embodiment is 1.845 mm, the HFOV thereof is 73.000°, Fno thereof is 2.80, and the system length thereof is 10.679 mm.

In the seventh embodiment, the object-side surfaces 31, 41, and 61 and the image-side surfaces 32, 42, and 62 of the first lens element 3, the second lens element 4, and the fourth lens element 6 are aspheric surfaces, and the object-side surface 51 and the image-side surface 52 of the third lens element 5 are spherical surfaces. FIG. 33 shows the aspheric coefficients used in the formula (1) of the object-side surfaces 31, 41, and 61 and the image-side surfaces 32, 42, and 62 of the first lens element 3, the second lens element 4, and the fourth lens element 6 in the seventh embodiment.

In addition, the relations among important parameters pertaining to the optical imaging lens 10 in the seventh embodiment are shown in FIG. 51.

The longitudinal spherical aberration of the seventh embodiment shown in FIG. 31A is simulated in the condition that the pupil radius is 0.3295 mm. According to the longitudinal spherical aberration diagram of the seventh embodiment shown in FIG. 31A, a deviation of the imaging points of the off-axis rays of different heights is controlled within a range of ±5.0 μm. According to the two field curvature aberration diagrams of FIG. 31B and FIG. 31C, a focal length variation of the three representative wavelengths in the whole field of view falls within ±16 μm. According to the distortion aberration diagram of FIG. 31D, a distortion aberration of the seventh embodiment is maintained within the range of ±70%. Therefore, compared to the existing optical lens, the seventh embodiment may also achieve the good optical performance under a condition that the system length is reduced to about 10.679 mm.

According to the above description, compared to the first embodiment, the advantages of the seventh embodiment are as follows. The system length of the seventh embodiment is shorter than the system length of the first embodiment. In addition, the range of field curvature aberration regarding the sagittal direction in the seventh embodiment is smaller than the range of field curvature aberration regarding the sagittal direction in the first embodiment, and the optical imaging lens of the seventh embodiment is easier to be fabricated compared to that of the first embodiment, so that a production yield is relatively high.

FIG. 34 is a schematic view illustrating an optical imaging lens according to an eighth embodiment of the invention, FIGS. 35A to 35D are diagrams illustrating longitudinal spherical aberration and other aberrations of the optical imaging lens according to the eighth embodiment of the invention. Referring to FIG. 34, the eighth embodiment of the optical imaging lens 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 34.

The detailed optical data pertaining to the optical imaging lens 10 is shown in FIG. 36, and the effective focal length of the total system in the eighth embodiment is 1.773 mm, the HFOV thereof is 73.000°, Fno thereof is 2.80, and the system length thereof is 11.048 mm.

In the eighth embodiment, the object-side surfaces 31, 41, and 61 and the image-side surfaces 32, 42, and 62 of the first lens element 3, the second lens element 4, and the fourth lens element 6 are aspheric surfaces, and the object-side surface 51 and the image-side surface 52 of the third lens element 5 are spherical surfaces. FIG. 37 shows the aspheric coefficients used in the formula (1) of the object-side surfaces 31, 41, and 61 and the image-side surfaces 32, 42, and 62 of the first lens element 3, the second lens element 4, and the fourth lens element 6 in the eighth embodiment.

In addition, the relations among important parameters pertaining to the optical imaging lens 10 in the eighth embodiment are shown in FIG. 51.

The longitudinal spherical aberration of the eighth embodiment shown in FIG. 35A is simulated in the condition that the pupil radius is 0.3166 mm. According to the longitudinal spherical aberration diagram of the eighth embodiment shown in FIG. 35A, a deviation of the imaging points of the off-axis rays of different heights is controlled within a range of ±5.0 μm. According to the two field curvature aberration diagrams of FIG. 35B and FIG. 35C, a focal length variation of the three representative wavelengths in the whole field of view falls within ±12 μm. According to the distortion aberration diagram of FIG. 35D, a distortion aberration of the eighth embodiment is maintained within the range of ±70%. Therefore, compared to the existing optical lens, the eighth embodiment may also achieve the good optical performance under a condition that the system length is reduced to about 11.048 mm.

According to the above description, compared to the first embodiment, the advantages of the eighth embodiment are as follows. The range of field curvature aberration regarding the sagittal direction in the eighth embodiment is smaller than the range of field curvature aberration regarding the sagittal direction in the first embodiment, and the range of field curvature aberration regarding the tangential direction in the eighth embodiment is smaller than the range of field curvature aberration regarding the tangential direction in the first embodiment. In addition, the optical imaging lens of the eighth embodiment is easier to be fabricated compared to that of the first embodiment, so that a production yield is relatively high.

FIG. 38 is a schematic view illustrating an optical imaging lens according to a ninth embodiment of the invention, FIGS. 39A to 39D are diagrams illustrating longitudinal spherical aberration and other aberrations of the optical imaging lens according to the ninth embodiment of the invention. Referring to FIG. 38, the ninth embodiment of the optical imaging lens 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 38.

The detailed optical data pertaining to the optical imaging lens 10 is shown in FIG. 40, and the effective focal length of the total system in the ninth embodiment is 1.880 mm, the HFOV thereof is 73.000°, Fno thereof is 2.80, and the system length thereof is 10.910 mm.

FIG. 41 shows the aspheric coefficients used in the formula (1) of the object-side surface 31 of the first lens element 3 through the image-side surface 62 of the fourth lens element 6 in the ninth embodiment.

In addition, the relations among important parameters pertaining to the optical imaging lens 10 in the ninth embodiment are shown in FIG. 51.

The longitudinal spherical aberration of the ninth embodiment shown in FIG. 39A is simulated in the condition that the pupil radius is 0.3356 mm. According to the longitudinal spherical aberration diagram of the ninth embodiment shown in FIG. 39A, a deviation of the imaging points of the off-axis rays of different heights is controlled within a range of ±4.5 μm. According to the two field curvature aberration diagrams of FIG. 39B and FIG. 39C, a focal length variation of the three representative wavelengths in the whole field of view falls within ±16 μm. According to the distortion aberration diagram of FIG. 39D, a distortion aberration of the ninth embodiment is maintained within the range of ±70%. Therefore, compared to the existing optical lens, the ninth embodiment may also achieve the good optical performance under a condition that the system length is reduced to about 10.910 mm.

According to the above description, compared to the first embodiment, the advantages of the ninth embodiment are as follows. The range of field curvature aberration regarding the sagittal direction in the ninth embodiment is smaller than the range of field curvature aberration regarding the sagittal direction in the first embodiment. In addition, the optical imaging lens of the ninth embodiment is easier to be fabricated compared to that of the first embodiment, so that a production yield is relatively high.

FIG. 42 is a schematic view illustrating an optical imaging lens according to a tenth embodiment of the invention, FIGS. 43A to 43D are diagrams illustrating longitudinal spherical aberration and other aberrations of the optical imaging lens according to the tenth embodiment of the invention. Referring to FIG. 42, the tenth embodiment of the optical imaging lens 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 42.

The detailed optical data pertaining to the optical imaging lens 10 is shown in FIG. 44, and the effective focal length of the total system in the tenth embodiment is 1.868 mm, the HFOV thereof is 73.000°, Fno thereof is 2.80, and the system length thereof is 10.377 mm.

FIG. 45 shows the aspheric coefficients used in the formula (1) of the object-side surface 31 of the first lens element 3 through the image-side surface 62 of the fourth lens element 6 in the tenth embodiment.

In addition, the relations among important parameters pertaining to the optical imaging lens 10 in the tenth embodiment are shown in FIG. 51.

The longitudinal spherical aberration of the tenth embodiment shown in FIG. 43A is simulated in the condition that the pupil radius is 0.3336 mm. According to the longitudinal spherical aberration diagram of the tenth embodiment shown in FIG. 43A, a deviation of the imaging points of the off-axis rays of different heights is controlled within a range of ±3.0 μm. According to the two field curvature aberration diagrams of FIG. 43B and FIG. 43C, a focal length variation of the three representative wavelengths in the whole field of view falls within ±30 μm. According to the distortion aberration diagram of FIG. 43D, a distortion aberration of the tenth embodiment is maintained within the range of ±70%. Therefore, compared to the existing optical lens, the tenth embodiment may also achieve the good optical performance under a condition that the system length is reduced to about 10.377 mm.

According to the above description, compared to the first embodiment, the advantages of the tenth embodiment are as follows. The system length of the tenth embodiment is shorter than the system length of the first embodiment, and the range of the longitudinal spherical aberration in the tenth embodiment is smaller than the range of the longitudinal spherical aberration in the first embodiment. In addition, the optical imaging lens of the tenth embodiment is easier to be fabricated compared to that of the first embodiment, so that a production yield is relatively high.

FIG. 46 is a schematic view illustrating an optical imaging lens according to a eleventh embodiment of the invention, FIGS. 47A to 47D are diagrams illustrating longitudinal spherical aberration and other aberrations of the optical imaging lens according to the eleventh embodiment of the invention. Referring to FIG. 46, the eleventh embodiment of the optical imaging lens 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 46.

The detailed optical data pertaining to the optical imaging lens 10 is shown in FIG. 48, and the effective focal length of the total system in the eleventh embodiment is 2.512 mm, the HFOV thereof is 73.000°, Fno thereof is 2.80, and the system length thereof is 10.243 mm.

In the eleventh embodiment, the object-side surfaces 31, 41, and 61 and the image-side surfaces 32, 42, and 62 of the first lens element 3, the second lens element 4, and the fourth lens element 6 are aspheric surfaces, and the object-side surface 51 and the image-side surface 52 of the third lens element 5 are spherical surfaces. FIG. 49 shows the aspheric coefficients used in the formula (1) of the object-side surfaces 31, 41, and 61 and the image-side surfaces 32, 42, and 62 of the first lens element 3, the second lens element 4, and the fourth lens element 6 in the eleventh embodiment.

In addition, the relations among important parameters pertaining to the optical imaging lens 10 in the eleventh embodiment are shown in FIG. 51.

The longitudinal spherical aberration of the eleventh embodiment shown in FIG. 47A is simulated in the condition that the pupil radius is 0.4486 mm. According to the longitudinal spherical aberration diagram of the eleventh embodiment shown in FIG. 47A, a deviation of the imaging points of the off-axis rays of different heights is controlled within a range of ±12.0 μm. According to the two field curvature aberration diagrams of FIG. 47B and FIG. 47C, a focal length variation of the three representative wavelengths in the whole field of view falls within ±30 μm. According to the distortion aberration diagram of FIG. 47D, a distortion aberration of the eleventh embodiment is maintained within the range of ±80%. Therefore, compared to the existing optical lens, the eleventh embodiment may also achieve the good optical performance under a condition that the system length is reduced to about 10.243 mm.

According to the above description, compared to the first embodiment, the advantages of the eleventh embodiment are as follows. The system length of the eleventh embodiment is shorter than the system length of the first embodiment. In addition, the optical imaging lens of the eleventh embodiment is easier to be fabricated compared to that of the first embodiment, so that a production yield is relatively high.

Referring to FIG. 50 and FIG. 51. FIG. 50 is a table diagram of optical parameters of each of the above-mentioned first through the fifth embodiments, and FIG. 51 is a table diagram of optical parameters of each of the above-mentioned sixth through the eleventh embodiments of the invention. When the relation of the optical parameters of the optical imaging lens 10 in the embodiments of the invention satisfies at least one of following conditional expressions, it assists a designer to design a technically feasible optical imaging lens having good optical properties and having a total length that is effectively reduced.

1. With the first lens element having negative refracting power and the aperture stop located between the second lens element and the third lens element, the field of view of the optical imaging lens is enlarged. Besides, the object-side surface of the second lens element faces the object side and has a concave portion in a vicinity of the optical axis, and the image-side surface of the fourth lens element faces the image side and has a convex portion in a vicinity of a periphery of the fourth lens element. Based on the design abovementioned, the system aberration, the field curvature aberration and the distortion aberration are reduced, and the optical imaging lens has good and stable optical properties and provides good image quality while the length of lens system is shortened.

In addition, with the image-side surface of the second lens element facing the image side and having a convex portion in a vicinity of a periphery, the configuration of the optical imaging lens is more optimized.

2. In the embodiments of the invention, a quantity of lens elements having refracting power of the optical imaging lens is only four. In order to shorten the length of the lens system and maintain image quality of the optical imaging lens, the thicknesses of the lens elements and the air gaps among the lens elements in the embodiments of the invention are suitably shortened, though considering a difficulty level of an assembling process of the lens elements and under the premise that the imaging quality has to be ensured, the thicknesses of the lens elements and the air gaps among the lens elements have to be suitably adjusted, so as to keep the thickness of and the space for each lens at a suitable value to prevent any of the parameters being too large so that the miniaturization of the entire optical imaging lens 10 is difficult or to prevent any of the parameters being too small so that assembly is adversely affected or the difficulty in production is increased. Therefore, under the circumstance that the value limitations in the following conditional expressions are satisfied, the optical imaging system may achieve better configuration, so that the optical imaging lens 10 has both a shorter length of the lens system and a good image quality:

$ALT/(G12+G34) \leq 2.4$, preferably $0.9 \leq ALT/(G12+G34) \leq 2.4$;

$T2/G34 \leq 5.5$, preferably $1.0 \leq T2/G34 \leq 5.5$;

$TTL/(G34+T4) \leq 10.0$, preferably $4.0 \leq TTL/(G34+T4) \leq 10.0$;

$(G12+G23)/T2 \leq 3.2$, preferably $1.0 \leq (G12+G23)/T2 \leq 3.2$;

$ALT/(T1+T4) \geq 3.0$, preferably $3.0 \leq ALT/(T1+T4) \leq 6.5$;

$(T2+T3)/G23 \geq 3.0$, preferably $3.0 \leq (T2+T3)/G23 \leq 27.0$;

$AAG/T1 \geq 5.0$, preferably $5.0 \leq AAG/T1 \leq 11.0$;

$(T3+T4)/G34 \leq 9.0$, preferably $0.8 \leq (T3+T4)/G34 \leq 9.0$;

$AAG/G23 \geq 3.4$, preferably $3.4 \leq AAG/G23 \leq 15.0$;

$T3/T1 \geq 2.2$, preferably $2.2 \leq T3/T1 \leq 7.2$;

$(T1+T2)/G23 \geq 2.5$, preferably $2.5 \leq (T1+T2)/G23 \leq 14.0$;

$T2/T1 \geq 2.2$, preferably $2.2 \leq T2/T1 \leq 6.5$;

$ALT/T1 \geq 6.0$, preferably $6.0 \leq ALT/T1 \leq 15.1$.

The design abovementioned is an adjustment under the circumstances of considering the difficulty in production. Based on the design abovementioned, the difficulty in production of the optical imaging lens may be decreased, so that a production yield of the optical imaging lens is high.

2. In the process of shortening the length of lens system by shortening the air gaps of the optical imaging lens, the effective focal length of the optical imaging lens is shortened thereby, so under the circumstance that the value limitations in the following conditional expressions are satisfied, the difficulty in production of the optical imaging lens may not be over increased, and the optical imaging system may achieve better configuration:

$EFL/G34 \leq 7.5$, preferably $1.0 \leq EFL/G34 \leq 7.5$;

$EFL/T1 \geq 2.5$, preferably $2.5 \leq EFL/T1 \leq 4.5$.

However, due to the unpredictability in the design of an optical system, with the framework of the embodiments of the invention, under the circumstances where the above-described conditions are satisfied, the lens according to the embodiments of the invention with shorter length, bigger aperture availability, increased field of angle, improved image quality or better yield rate can be preferably achieved so as to improve the shortcoming of prior art.

In addition, the aforementioned limitation relations are provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form an additional concave portion in the vicinity of the optical axis or an additional concave portion in the vicinity of the periphery on the image-side surface of the second lens element. It should be noted that the above-described details can be optionally combined and applied to the other embodiments of the invention under the condition where they are not in conflict with one another.

Based on the above, the optical imaging lens 10 in the embodiment of the invention may achieve the following effects and advantages.

1. The longitudinal spherical aberrations, astigmatism aberrations and distortion aberrations of each of the embodiments of the invention are all complied with usage specifications. Moreover, the off-axis rays of different heights of the three representative wavelengths 830 nm, 850 nm and 870 nm are all gathered around imaging points, and according to a deviation range of each curve, it can be seen that deviations of the imaging points of the off-axis rays of different heights are all controlled to achieve a good capability to suppress spherical aberration, astigmatism aberration and distortion aberration. Referring to the imaging quality data, distances among the three representative wavelengths 830 nm, 850 nm and 870 nm are fairly close, which represents that the optical imaging lens of the embodiments of the invention have a good concentration of rays with different wavelengths and under different states, and have an excellent capability to suppress dispersion, so it is learned that the optical imaging lens of the embodiments of the invention have good optical properties.

2. In the embodiment of the invention, the first lens element 3 in the optical imaging lens 10 has negative refracting power, and the aperture stop 2 located between the second lens element 4 and the third lens element 5, which enlarges the field of view of the optical imaging lens 10. In addition, the object-side surface 41 of the second lens element 4 faces the object side and has the concave portion 411 in the vicinity of the optical axis I, and the image-side surface 62 of the fourth lens element 6 faces the image side and has the convex portion 622 in the vicinity of the periphery of the fourth lens element 6, so that the system aberration, the field curvature aberration and the distortion aberration of the optical imaging lens 10 are reduced, and the optical imaging lens 10 has good optical properties and provides good image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a first lens element, a second lens element, an aperture stop, a third lens element, and a fourth lens element arranged in sequence from an object side to an image side along an optical axis, and each of the first lens element to the fourth lens element comprising an object-side surface facing the object side and allowing imaging rays to pass through and an image-side surface facing the image side and allowing the imaging rays to pass through;

the first lens element having negative refracting power;
the object-side surface of the second lens element having a concave portion in a vicinity of the optical axis;
the object-side surface of the third lens element having a convex portion in a vicinity of a periphery of the third lens element;

the fourth lens element having negative refracting power, the image-side surface of the fourth lens element having a convex portion in a vicinity of a periphery of the fourth lens element, wherein a quantity of lens elements having refracting power of the optical imaging lens is only four, and the optical imaging lens satisfies:

$$ALT/(G12+G34) \leq 2.4, (T2+T3)/G23 \geq 3.0 \text{ and } ALT/T1 \geq 6.0,$$

wherein, ALT is a sum of four thicknesses of the first lens element, the second lens element, the third lens element, and the fourth lens element along the optical axis, G12 is an air gap from the first lens element to the second lens element along the optical axis, G34 is an air gap from the third lens element to the fourth lens element along the optical axis, T1 is a thickness of the first lens element along the optical axis, T2 is a thickness of the second lens element along the optical axis, T3 is a thickness of the third lens element along the optical axis, and G23 is an air gap from the second lens element to the third lens element along the optical axis.

2. The optical imaging lens as recited in claim 1, wherein the image-side surface of the second lens element has a convex portion in a vicinity of a periphery of the second lens element.

3. The optical imaging lens as recited in claim 2, wherein the optical imaging lens satisfies: T2/G34≤5.5.

4. The optical imaging lens as recited in claim 1, wherein the optical imaging lens satisfies: TTL/(G34+T4)≤10.0, wherein TTL is a distance from the object-side surface of the first lens element to an image plane of the optical imaging lens along the optical axis, and T4 is a thickness of the fourth lens element along the optical axis.

5. The optical imaging lens as recited in claim 4, wherein the optical imaging lens satisfies: (G12+G23)/T2≤3.2.

6. The optical imaging lens as recited in claim 1, wherein the optical imaging lens satisfies: EFL/G34≤7.5, wherein EFL is an effective focal length of the optical imaging lens.

7. The optical imaging lens as recited in claim 6, wherein the optical imaging lens satisfies: ALT/(T1+T4)≥3.0, wherein T4 is a thickness of the fourth lens element along the optical axis.

8. The optical imaging lens as recited in claim 1, wherein the optical imaging lens satisfies: AAG/T1≥5.0, wherein AAG is a sum of three air gaps from the first lens element to the fourth lens element along the optical axis.

9. The optical imaging lens as recited in claim 1, wherein the optical imaging lens satisfies: (T3+T4)/G34≤9.0, wherein T4 is a thickness of the fourth lens element along the optical axis.

10. The optical imaging lens as recited in claim 9, wherein the optical imaging lens satisfies: AAG/G23≥3.4, wherein AAG is a sum of three air gaps from the first lens element to the fourth lens element along the optical axis.

11. The optical imaging lens as recited in claim 1, wherein the optical imaging lens satisfies: EFL/T1≥2.5, wherein EFL is an effective focal length of the optical imaging lens.

12. The optical imaging lens as recited in claim 11, wherein the optical imaging lens satisfies: T3/T1≥2.2.

13. The optical imaging lens as recited in claim 1, wherein the optical imaging lens satisfies: (T1+T2)/G23≥2.5.

14. The optical imaging lens as recited in claim 1, wherein the optical imaging lens satisfies: T2/T1≥2.2.

* * * * *